United States Patent
Miller et al.

(10) Patent No.: US 9,029,282 B2
(45) Date of Patent: May 12, 2015

(54) NITROGEN FIXATION BY TITANIUM DIOXIDE

(71) Applicants: Glenn C. Miller, Reno, NV (US); Ahmed Al-Taani, Irbid (JO)

(72) Inventors: Glenn C. Miller, Reno, NV (US); Ahmed Al-Taani, Irbid (JO)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 0 days.

(21) Appl. No.: 14/074,119

(22) Filed: Nov. 7, 2013

(65) Prior Publication Data
US 2014/0186254 A1    Jul. 3, 2014

Related U.S. Application Data

(63) Continuation of application No. 13/463,574, filed on May 3, 2012, now abandoned, which is a continuation of application No. 12/415,533, filed on Mar. 31, 2009, now abandoned.

(60) Provisional application No. 61/041,564, filed on Apr. 1, 2008.

(51) Int. Cl.
| | | |
|---|---|---|
| *C01B 21/30* | (2006.01) | |
| *C01B 21/38* | (2006.01) | |
| *B01D 53/86* | (2006.01) | |
| *B01J 21/06* | (2006.01) | |
| *B01J 21/20* | (2006.01) | |
| *B01J 37/06* | (2006.01) | |
| *B01J 37/08* | (2006.01) | |
| *B01J 38/02* | (2006.01) | |
| *C01B 21/48* | (2006.01) | |
| *C01B 21/50* | (2006.01) | |
| *C01G 23/047* | (2006.01) | |

(52) U.S. Cl.
CPC ............ *C01B 21/38* (2013.01); *B01D 53/8621* (2013.01); *B01D 2255/20707* (2013.01); *B01D 2255/802* (2013.01); *B01D 2257/102* (2013.01); *B01D 2259/4558* (2013.01); *B01J 21/063* (2013.01); *B01J 21/20* (2013.01); *B01J 37/06* (2013.01); *B01J 37/08* (2013.01); *B01J 38/02* (2013.01); *C01B 21/48* (2013.01); *C01B 21/50* (2013.01); *C01G 23/047* (2013.01); *C01P 2006/12* (2013.01)

(58) Field of Classification Search
None
See application file for complete search history.

(56) References Cited

U.S. PATENT DOCUMENTS

| | | | | |
|---|---|---|---|---|
| 4,113,590 | A * | 9/1978 | Schrauzer et al. | 204/157.46 |
| 4,271,137 | A * | 6/1981 | Harteck | 423/395 |
| 6,027,775 | A * | 2/2000 | Kasuga et al. | 428/34.1 |
| 6,416,982 | B1 * | 7/2002 | Zhang | 435/173.8 |
| 7,901,660 | B2 * | 3/2011 | Xie et al. | 423/598 |

* cited by examiner

*Primary Examiner* — Melvin C Mayes
*Assistant Examiner* — Stefanie Cohen
(74) *Attorney, Agent, or Firm* — Ryan A. Heck; UNR-DRI Technology Transfer Office

(57) ABSTRACT

In various embodiments, the present disclosure provides a method of fixing nitrogen. An amount of titania catalyst is provided and contacted with a feed stream that includes nitrogen. The titania catalyst is heated. The heated titania catalyst fixes nitrogen in the feed stream to form nitrogen products, such as nitrates. The nitrogen products are then removed from the titania catalyst. In some examples, the titania catalyst is treated with a base. In further examples, the catalytic process is carried out in the absence of light for photochemically activating the titania catalyst.

15 Claims, 16 Drawing Sheets

NITROGEN FIXATION BY TITANIUM DIOXIDE

CROSS REFERENCE TO RELATED APPLICATION

This application is a continuation of, and incorporates by reference, U.S. patent application Ser. No. 13/463,574, filed May 3, 2012, which in turn is a continuation of, and incorporates by reference U.S. patent application Ser. No. 12/415,533, filed Mar. 31, 2009, which in turn claims the benefit of, and incorporates by reference, U.S. Provisional Patent Application No. 61/041,564, filed Apr. 1, 2008.

STATEMENT OF GOVERNMENT SUPPORT

This invention was made with United States Government support under a grant from the National Science Foundation, Grant No. EPS-0447416. The United States Government has certain rights in the invention.

TECHNICAL FIELD

The present disclosure relates to materials, methods, and systems that can be used to fix nitrogen. In a particular example, heated titania is used to fix atmospheric nitrogen to produce nitrate.

BACKGROUND

Biological nitrogen fixation contributes about 65% of the world's annual nitrogen fixation, and industrially produced nitrogen fertilizers, primarily produced by the Haber-Bosch process, accounts for 25% of the total annual nitrogen fixation. The Haber-Bosch ammonia process is presently the only available non-biological technology that has been commercially exploited. The Haber-Bosch process has a relatively high operational cost, operates at relatively high temperatures and pressures, and depends on non-renewable and depleting sources of energy.

Titanium dioxide ($TiO_2$), or titania, is common soil constituent and a semiconducting material that can be photochemically stimulated by light energy. It is primarily extracted from sand deposits. Two active forms of $TiO_2$ are commonly known in heterogeneous photocatalytic reactions, rutile and anatase, with anatase generally being photocatalytically more active.

In 1977, Schrauzer and Guth reported a successful photocatalytic synthesis of ammonia from atmospheric nitrogen by illuminating iron-doped $TiO_2$ with ultraviolet (UV) light in the presence of water vapor. Since then, various attempts have been made to artificially fix elemental nitrogen using a variety of catalysts. Although some photocatalytic reactions fix nitrogen to a degree, none have been applied on an industrial scale, typically due to their low quantum yields.

SUMMARY

In one embodiment, the present disclosure provides a nitrogen fixation system. The system includes a nitrogen source, such as air, air with an enhanced nitrogen content, or a pure nitrogen source mixed with oxygen. In a specific example, the system includes a feed stream concentrator. The feed stream concentrator is configured to increase the nitrogen content of a nitrogen-containing feed stream.

A reactor is fluidly coupled to the nitrogen source. In some implementations, the reactor is at least substantially opaque. In another example, the reactor does not include a light source for photochemically activating a titania catalyst. The reactor contains an amount of titania catalyst. Titania material used in the system have a surface area suitable for facilitating the fixation process. In some examples, the titania catalyst has a surface area of at least about 150 $cm^2/g$, at least about 500 $cm^2/g$, or between about 150 $cm^2/g$ and at about 500 $cm^2$.

The system also includes a heater thermally coupled to the reactor. The heater is configured to heat the catalyst in the reactor at a desired temperature. In one implementation, the heater includes a solar energy heater. The solar energy heater can be used to power the heater or to provide a source of heat for the heater.

A water supply is included in the system and is fluidly coupled to the reactor. The water supply is configured to provide water to wash reaction products from the titania catalyst.

The system also includes a water removal system, such as an evaporator, a freeze dryer, or a membrane water removal unit. In some implementations, the system includes a water recycling unit. The water recycling unit is typically disposed between the water supply and the water removal system. Water produced by the water removal system is optionally recovered by the water recycling unit and is returned to the water supply.

In some implementations, the system includes a solid/liquid separator that may be used to separate the titania catalyst from the water. One suitable separator uses a screen or filter to separate solid and liquid components. Gravity separators, such as centrifugal separators, cyclones, or whirlpools, may also be used. A settling tank may be used to separate solid catalyst from the water.

In one configuration, the system includes a catalyst recycling unit fluidly coupled to the reactor. According to one specific example, catalyst separated from water, or catalyst from the reactor, is regenerated using the catalyst recycling unit. For example, the catalyst recycling unit may include a comminutor for increasing the urface area of the catalyst. In another example, the catalyst includes a heater for heating the catalyst at a desired temperature to restore at least a portion of its catalytic activity.

In another embodiment, the present disclosure provides a nitrogen fixation method. According to the method, an amount of titania catalyst is provided. The titania catalyst is contacted with a feed stream comprising nitrogen. The titania catalyst, in the presence of the feed stream, is heated at temperature sufficient to fix nitrogen from the feed stream and form nitrogen products. The nitrogen products are then removed from the titania catalyst.

In some examples, the nitrogen products include nitrates and/or nitrites. The reaction conditions, such as the concentration or type of base used, the temperature or duration of heating, can be selected to provide a desired result, such as to increase reaction rates, favor a particular nitrogen product, etc.

In some implementations, the catalyst is heated at a temperature greater than the ambient temperature, such as between about 40° C. and about 600° C., between about 150° C. and about 350° C., between about 200° C. and about 400° C., or between about 175° C. and about 275° C. In various examples, the catalyst is heated for a period of time sufficient to produce a desired amount of nitrogen products, such as at least about 1 hour, at least about 2 hours, at least about 4 hours, at least about 6 hours, or at least about 24 hours.

The reactor, in a particular configuration, is at least substantially opaque. In another configuration, the reactor does not include a light source for photochemically activating the titania catalyst.

The method can include a variety of additional steps. For example, the method can include adding a base, such as an alkali or alkaline earth metal hydroxide or oxides, or other salt, including Group I and II metal salts, such as a potassium salt, to the titania catalyst or the nitrogen products. As another step, the method can include converting solar radiation into heat and using the heat so generated to heat the titania catalyst. The method can include enriching the nitrogen content of the feed stream.

In one implementation, removing nitrogen products from the titania catalyst includes contacting the titania catalyst with water. The nitrogen products dissolve in the water. After dissolution of the nitrogen products, the water may be separated from the titania catalyst. For example, the separated water can be removed, such as by evaporation, to recover the nitrogen products. The removed water, in one implementation, is recycled and used to extract further nitrogen products from the titania catalyst. The separated titania catalyst is, in some examples, regenerated and used to fix additional nitrogen from the feed stream.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

DETAILED DESCRIPTION

Figure 1:
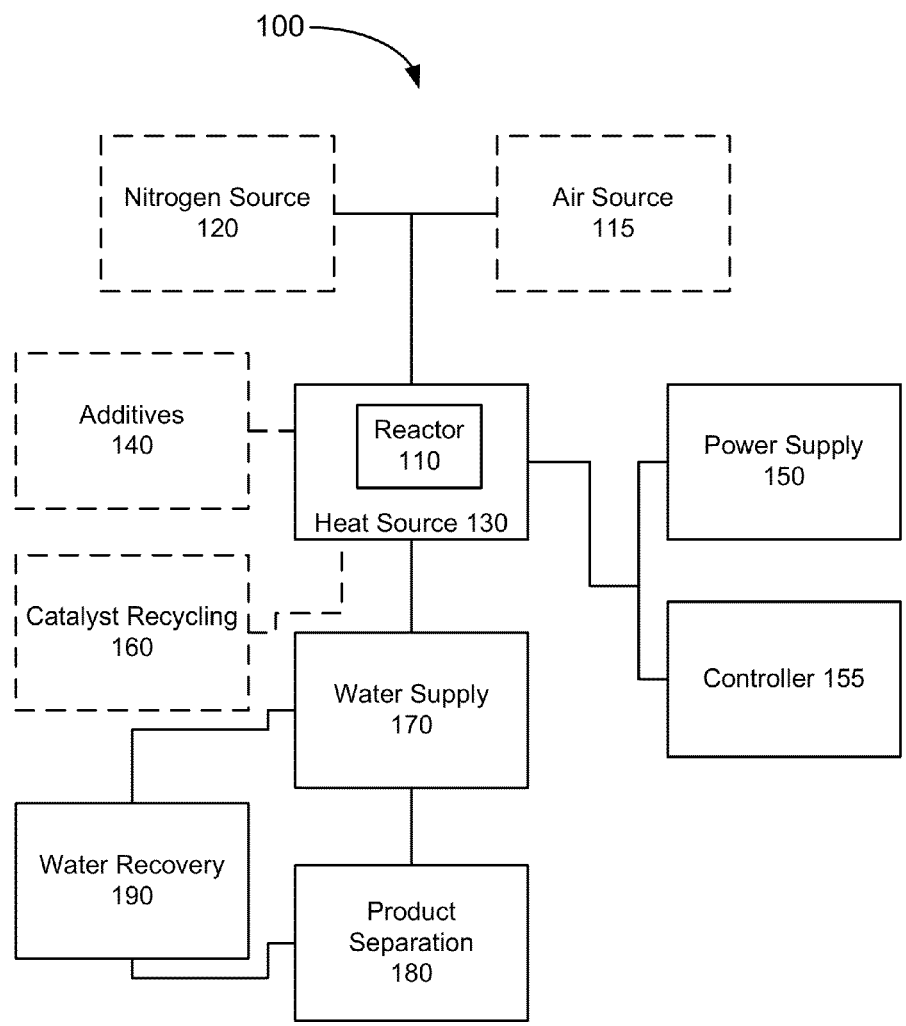
FIG. 1 is a block diagram of one disclosed embodiment of a system for fixing nitrogen using a titania catalyst.

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting.

Generally the present disclosure provides a method for producing nitrogen compounds, such as nitrates or nitrites, using metal oxide catalysts, particularly titanium dioxide (also referred to as titania). Materials and systems useable for this method are also provided. Unless otherwise specified, the various aspects of the present disclosure may use any suitable source of $TiO_2$. Suitable sources of $TiO_2$ can be selected for a particular embodiment of the method, such as based on parameters of a particular production system. Various factors that may influence the titania material used are discussed in more detail below.

Titania Catalysts

Any form, or mixture of forms, of $TiO_2$ may be used, including anatase, rutile, brookite, and titanium dioxide (B) forms. In at least some embodiments, anatase $TiO_2$ produces higher amounts of nitrate than rutile forms. Thus, higher nitrate yields may be obtained under at least some conditions using anatase $TiO_2$. However, anatase $TiO_2$ may be more expensive than other forms of $TiO_2$ such as, for example, rutile $TiO_2$. Thus, cost considerations may suggest the use of rutile $TiO_2$ in some operations.

The $TiO_2$ can be provided in a variety of physical forms, such as powders, pellets, and granules. Such materials typically have an average cross sectional diameter of between about 0.05 μm and about 5 mm, between about 0.1 μm and about 100 μm, between about 0.5 μm and about 10 μm, between about 2 μm and about 500 μm, or between about 1 μm and about 5 μm.

$TiO_2$ can also be provided as a coated material on a support structure, such as coated spheres, belts, screens, or honeycomb structures. Suitable support materials are generally inert under the process conditions to which they will be subjected, and include metals, glasses, polymeric materials, such as plastics or rubbers, and ceramics. When catalysis is carried out substantially in the solid/vapor phases (a solid catalyst interacting with a vapor substrate), the properties of the support material may be selected to aid in those processes, such as to facilitate separation of the catalyst and product or to facilitate catalyst regeneration. The properties of the support material may also be selected to increase the durability of the catalyst. For example, if air agitated particles are used as the catalyst, support materials having a degree of elasticity may reduce catalyst degradation.

In a particular application, a thin, typically flexible, material is coated or impregnated with $TiO_2$. Suitable materials include plastic films. The $TiO_2$ covered film may be placed proximate an area where nitrogen fixation products are desired. For example, the film may be placed by plants, such as between plant rows in a garden or farm. Exposure to ambient light and temperatures results in nitrogen fixation. Precipitation or irrigation may be used to wash nitrogen products from the film and into surrounding soil.

When coated surfaces are used for catalysis, the $TiO_2$ coating typically has a thickness selected to adequately cover the support surface with a coating having a sufficient mechanical durability. In some examples, the coating has a thickness of between about 0.1 μm and about 5 mm, between about 0.5 μm and about 1 mm, or between about 1 μm and about 100 μm. Expressed another way, the loading of $TiO_2$ on the surface is between about 0.05 $g/m^2$ and about 5,000 $g/m^2$, between about 0.1 $g/m^2$ and about 1000 $g/m^2$, or between about 0.5 $g/m^2$ and about 750 $g/m^2$.

For a given set of process conditions, higher catalyst surface area typically results in higher nitrate yields. However, at some point, certain high surface area materials may be unsuitable for use in a given process. For example, decreasing particle size may increase the effective surface area of a given quantity of catalyst. However, particle sizes below a certain value may make the catalyst difficult to use. For example, small particles may become difficult to separate from process streams, such as water.

$TiO_2$ materials, whether used alone or as a surface coating, may also take specialized forms having high surface area. For example, $TiO_2$ nanostructures, such nanorods and nanotubes, are known to have high surface areas, and can be used in the disclosed embodiments of the present disclosure.

Catalysis Reaction Conditions

The catalytic process is typically carried out at a temperature between ambient temperatures and about 700° C., such as between about 20° C. and about 700° C., between about 25° C. and about 500° C., between about 50° C. and about 500° C., between about 75° C. and about 450° C., between about 50° C. and about 150° C., between about 75° C. and about 125° C., between about 100° C. and about 400° C., between about 150° C. and about 350° C., between about 175° C. and about 225° C., or between about 150° C. and about 250° C. In specific examples, the temperature is about 75° C., about 100° C., about 150° C., about 200° C., about 250° C., about 300° C., about 350° C., or about 400° C.

The $TiO_2$ catalyst is typically heated for a period of time sufficient to produce a desired amount of nitrate. The period of time required to generate a particular amount of nitrate usually depends on the nature of the catalyst (such as its surface area or form), the feed composition (such as the amount of nitrogen in the feed), the amount of salt or base added, the pressure, and the temperature of the process. For example, shorter reaction times can typically be used when higher temperatures are used. Typical average reaction times are between about 5 minutes and about 96 hours, between about 30 minutes and about 12 hours, between about 1 hour and about 10 hours, between about 2 hours and about 9 hours, between about 2 hours and about 8 hours, between about 4 hours and about 8 hours, or between about 6 hours and about 8 hours. For example, the reaction time may be about 2, 4, 5, 6, 7, 8, 9, 10, 24, or 75 hours. Although the catalyst is typically heated at a constant temperature, ramped or stepped temperature regimes may be used.

Various additives may be added to the catalyst, substrate, or other components of the catalytic process in order to improve various aspects of the nitrogen fixation process, such as the rate of nitrate formation, the stability of the catalyst, or the amount of nitrate produced. One suitable additive is nitrogen. As the process is believed to involve fixation of nitrogen from vapor, increasing the nitrogen available to the catalyst can enhance nitrate formation. In at least some embodiments, the nitrogen concentration is increased to levels above atmospheric levels. Nitrogen may be added from an external nitrogen source, such as a source of compressed nitrogen. Nitrogen may also be increased by filtration through a membrane.

Suitable membrane filters are commercially available. In a specific embodiment, part of a feed source is passed through a membrane filter. Nitrogen from the filter is then recombined with the feed source, effectively increasing the level of nitrogen in the feed.

Although the catalytic process is typically carried out at ambient atmospheric pressures, the process may be carried out under higher pressures. Higher pressures may improve reaction rates or nitrate yields. However, the use of higher pressures can also increase operating costs and system complexity.

The pH at which the catalysis reaction occurs, such as the pH of the catalyst surface, can affect nitrate production, as well as production of other materials, such as nitrite. Accordingly, the pH of the catalytic system can be adjusted, such as by adding a base. Suitable bases include alkali or alkaline earth metal hydroxides or oxides, such as sodium hydroxide, potassium hydroxide, calcium hydroxide, or calcium oxide. In one aspect, the amount of base added is an amount sufficient to maintain the pH of the catalyst above about 5, such as above about 5.3, above about 5.5, or above about 6.0. The amount and nature of the base can also be used to adjust the products formed from a particular catalytic process, such as the ratio of nitrates-to-nitrites.

In some implementations, the nitrogen fixation products include liquid products, such as nitrate in the form of a nitric acid solution. The solution can be subjected to other processing steps, such as neutralization, concentration, or precipitation. For example, salts, such as basic salts, or bases, such as alkali or alkaline earth metal hydroxides or oxides, can be added to the nitric acid solution. In a particular example, the salt is a potassium salt. Adding basic salts may serve to both neutralize the acidic product solution and form nitrate or other product salts.

In another example, the nitrogen fixation products are isolated directly as salts, such as nitrate or nitrite salts. For example, when base was added during catalysis, the cation of the base can serve as the cation of the product salt.

FIG. 1 is a block diagram of a system 100 useable to convert air 115 or another nitrogen source 120 to nitrates using titanium dioxide. The system 100 includes a catalysis reactor 110. The catalysis reactor 110 includes a quantity of titanium dioxide. The catalysis reactor 110 can be set up, in various aspects of the present disclosure, to operate in batch, semi-continuous, or continuous processes. Details of a suitable system for a continuous process are described later in this disclosure.

In some examples, the catalysis reactor 110 is in communication with a nitrogen source 120. The nitrogen source 120 may be any suitable source, including air having an enhanced nitrogen concentration, pure nitrogen sources, or mixtures thereof. When both air 115 and another nitrogen source 120 are used, the system 100 may include a mixing valve (not shown) or other component suitable for achieving a desired feed stream composition for the reactor 110.

The catalysis reactor 110 is coupled to a heat source 130. In one example, the heat source 130 is an oven surrounding the catalysis reactor 110. In other examples, the heat source 130 includes a heating element that is applied to at least a portion of the reactor 110, such as by a burner or a steam jacket.

In some examples, the heat source 130 is a source of ambient heat, or heat derived from ambient sources. For example, in hotter climates, ambient heat may be sufficient to operate the reactor 110. Similarly, in sunnier climates, sunlight may be used to generate heat, either actively or passively, to operate the reactor 110.

Various additives 140 may be added to the reactor 110. Additives may be used to increase the rate of nitrate formation, increase the yield of nitrates, adjust the yield of competing products, or increase the stability of the catalyst. For example, bases, such as alkali or alkaline earth metal hydroxides, including calcium hydroxide, potassium hydroxide, and sodium hydroxide, may be added to the reactor 110. As described elsewhere in this disclosure, the addition of bases to the titanium dioxide catalyst can increase the catalyst efficiency.

The system 100 also includes a power supply 150. The power supply 150 may be connected to reactor 110 or other components of the system 100. The power supply 150 may be, for example, used to power elements of the reactor 110, such as a blower or pump (not shown). The power supply 150 may also be used to operate the heat source 130, such as when the heat source 130 is an oven.

In some implementations, the power supply 150 is coupled to a power grid. In other implementations, the power supply 150 is coupled to a local or independent power supply, such as generator or a solar panel. Particularly when used in relatively sunny climates, the use of solar power can increase the operating efficiency of the system 100.

The system 100 also includes a controller 155 that can be used to monitor or control various aspects of the system 100. The controller 155 may be a specialized computing device or a general computing device, such as a personal computer, configured to operate one or more components of the system 100. For example, the controller 155 may be used to regulate the power supply 150, the heat source 130, the addition of additives 140, or control the flow of the nitrogen source 120 into the reactor 110. The controller 155 may also be used to control the operation of the reactor 110, or to monitor various parameters of the reactor 110, such as its temperature.

The system 100 includes a water supply 170. The water supply 170 may be used for removing products, such as nitrates, from the catalyst. For example, the products may be removed by rinsing the catalyst with water. The water can be removed in a separation unit 180. The separation unit 180 may, for example, remove water by evaporation, distillation, ion exchange, freeze drying, or membrane processes. Typically, the separation unit 180 produces a solid nitrogen-containing product, such as a nitrate. In other examples, the separation unit 180 produces a nitrogen-containing solution, typically a concentrated solution, such as a concentrated nitrate solution. Water removed via the separation unit 180 may be recycled back into the water supply 170.

In one example of the system 100 being used in a batch process, the reactor 110 is a rotating drum or an air agitated drum containing the catalyst. Water is periodically passed through the drum in order to wash products from the catalyst particles. The reactor 110 can then be heated and more nitrogen fixed. The reactor 110 can include a screen or filter to allow the water to exit the reactor 110 while retaining the catalyst particles.

Although shown as a separate component connected to the reactor 110 in FIG. 1, additives 140 may be added to the catalyst or products in combination with other components of the system 110 or as a separate component in communication with other components of the system 110. For example, bases or salts can be added to the nitrogen fixation products by the water supply 170 or in the separator 180.

Figure 2:
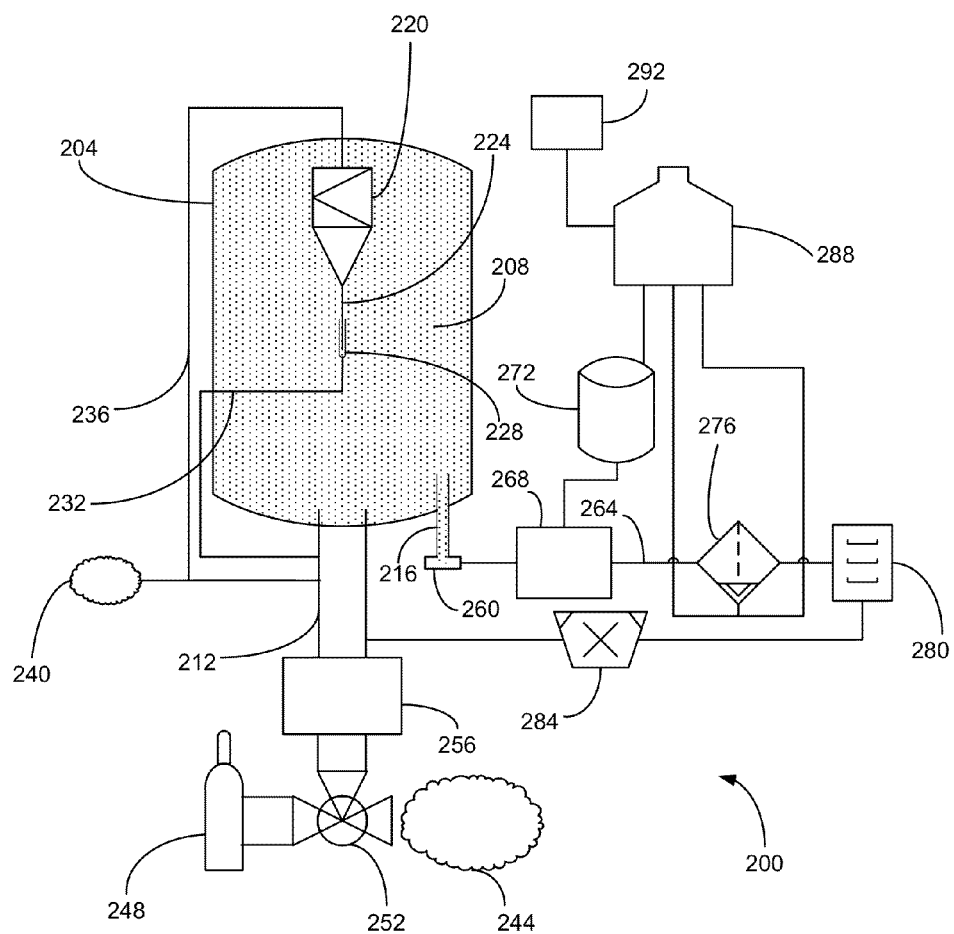
FIG. 2 is a schematic diagram of one disclosed embodiment of a system for continuously fixing nitrogen using a titania catalyst.

FIG. 2 is a schematic diagram of a system 200 that can be continuously operated to produce nitrate using titanium dioxide catalyst. The system 200 includes a reactor 204 having a quantity of titanium dioxide catalyst 208. In FIG. 2, the catalyst 208 is in a particulate form that is flowable within the reactor 204. However, the reactor 204 and system 200 can be designed to use other forms of catalyst, such as embedded catalysts.

The reactor 204 includes a feed stream inlet 212. Although shown at the bottom of the reactor 204, the feed stream inlet 212 may be placed elsewhere on the reactor 204. The reactor 204 also includes a standpipe 216, which can allow catalyst 208 to be removed from the reactor 204. Although shown at a bottom side of the reactor 204, the standpipe 216 may be located elsewhere on the reactor 204. In addition, the standpipe 216 is omitted in some implementations of the system 200. For example, the standpipe 216 may be omitted when the system 200 is modified to run in batch or semi-continuous mode.

The reactor 204 includes a separation device 220, such as a cyclone. In the embodiment shown, the separation device 220 includes a dip leg 224 extending into a baffle 228, such as a tube or boot shaped device. The separation device 220 and baffle 228 allow gas to be removed from the reactor 204. In other implementations, the separation device 220, dip leg 224, or baffle 228 are omitted. For example, the reactor 204 can include a screened outlet that allows air to exit the reactor 204 but retains the catalyst 208.

A transport line 232 connects the baffle 228 and the feed stream inlet 212. A transport line 236 connects the separation device 220 and the feed inlet stream 212. The transport line 236 is also connected to exhaust 240. However, the system 200 can be plumbed in a different manner than that shown in FIG. 2.

The feed inlet stream 212 is in fluid communication with a feed source 244. The feed source 244 may be, for example, the air. The feed inlet stream 212 is also in communication with a nitrogen source 248. In other implementations, one of the feed source 244 and nitrogen source 248 is omitted. For embodiments where both are used, the feed source 244 and the nitrogen source 248 may be in communication with a mixing valve 252.

The feed inlet stream 212, feed source 244, and nitrogen source 248 are optionally heated using a pre-heater 256. The preheater 256 is omitted in some implementations of the system 200.

The standpipe 216 is connected to a valve 260. The valve 260 is connected to a transfer line 264. In some configurations, the valve 260 is omitted and the standpipe 216 is directly connected to the transfer line 264. The transfer line 264 is sized to allow transport of catalyst 208 from the reactor 204. Accordingly, the size of the transfer line 264 may vary, such as based on the size, density, or other properties of the catalyst 208.

The transfer line 264 is connected to a mixer 268. The mixer 268 is in communication with a water source 272. The mixer 268 is connected to a separator 276. One suitable separator 276 uses a screen or filter to separate solid and liquid components. Gravity separators, such as centrifugal separators, cyclones, or whirlpools, may also be used. A settling tank may be used to separate solid catalyst from the water. Solid from the separator 276 is transferred to a heater 280. From the heater 280, the solid passes into a comminutator 284. The comminutator 284 is also in communication with the feed stream inlet 212. In other configurations, the comminutator 284 is in communication with the reactor 204 other than through the feed stream inlet 212. In yet further configurations, one or both of the heater 280 and the comminutator 284 is omitted.

The separator 280 is also in communication with an extractor 288. The extractor 288 may be, for example, an evaporator or a distillation device, a freeze dryer, or a semi-permeable membrane. The extractor 288 is in communication with a product storage unit 292. The extractor 288 is also in communication with the water source 272.

In operation, a feed, such as air, passes from the feed source 244 into the mixing valve 252. Nitrogen from the nitrogen source 248 also optionally enters the mixing valve 252. The mixing valve 252 is set to produce a desired feed stream composition.

The feed stream 212 from the mixing valve 252 passes into the preheater 256, where it is heated to a desired temperature, typically substantially the same temperature as the reactor 204. Preheating the feed stream can reduce temperature fluctuations in the reactor 204. Such preheating can also reduce the heating load for the reactor 204, or allow more types of heating to be used with the reactor 204, as large scale temperature adjustments are less likely to be needed.

The preheated feed stream passes from the preheater 256 into the reactor 204. The reactor 204 includes a quantity of catalyst 208. The catalyst 208 is free flowing and typically is agitated by the feed stream passing through the feed inlet 212. The catalyst 208 reacts with the feed stream to produce nitrogen-containing products, such as nitrates.

The gas inside the reactor 204 exits through the baffle 228, dip leg 224, and separator 220. The baffle 228 helps prevent catalyst 208 from entering the dip leg 224. Gas, likely still with particulate matter in it, passes into the separator 220. The separator 220 separates vapor phase materials from solid materials. The solid material, such as catalyst 208, is returned to the reactor 204. The vapor phase materials pass out of the separator 220 into the transfer line 236.

Depending on the conditions of the system 200, all or a portion of the vapor in the transfer line 236 may pass out of the system 220 as exhaust 240. However, all or a portion of the vapor in the transfer line 236 may be returned to the reactor 204 through the feed inlet 212. Typically, the catalyst 208 does not use all of the nitrogen in the feed stream. Therefore, the vapor in the transfer line 236 may be combined with fresh feed from the preheater 256 to produce a desired composition for the reactor 204. Recycling feed stream from the transfer line 236 back into the reactor 204 can be beneficial, as the recycled feed may not require any, or as much, heating, potentially reducing the power consumption of the system 200.

In FIG. 2, product is obtained from the reactor 204 as follows. A portion of the catalyst 208 passes into the standpipe 216 and then into the transfer line 264. When the valve 260 is included, the valve 260 can be used to help regulate the amount or rate of catalyst 208 entering the transfer line 264.

The catalyst 208 is carried in the transfer line 264 to the mixer 268. In the mixer 268, water from the water supply 272 is combined with the catalyst 208. Product nitrates, and potentially other products, on the catalyst 208 dissolve in the water. The combined water/catalyst 208 stream is passed to the separator 276.

In the separator 276, the solid catalyst 208 is separated from the water. The catalyst 208 is then transferred to a heater 280. The heater 280 heats the catalyst 208 to a desired temperature for desired period of time, such as to dry the catalyst 208 or otherwise regenerate the catalyst 208.

From the heater 280, the catalyst passes to the comminutor 284. Prior treatments may have increased the particle size, and thus decreased the surface area, of the catalyst 208. The comminutor may grind, crush, pulverize, or otherwise comminute the catalyst 208 to reduce the particle size or increase the surface area of the catalyst 208. The catalyst 208 is transferred from the comminutor 284 to the feed inlet 212, where it mixes with the feed stream and is returned to the reactor 208. Typically, the rate of catalyst 208 leaving the reactor 204 through the standpipe 216 is selected to be at least approximately equal to the rate at which catalyst 208 is returned to the reactor 204 through the feed inlet 212.

From the separator 276, water, with the particle level at least reduced, is transferred to the extractor 288. In the extractor 288, water is removed to obtain purified water, which may be returned to the water supply 272, and product material 292.

Bases or salts, such as to increase nitrogen fixation, alter product distribution, or provide cations to the products may be added at one or more stages of the system 200. For example, a source of these materials can be connected to the reactor 204, such as to the feed inlet 212 or via a separate inlet. The base or salts may be added, for example, as a fluid spray that is mixed with the catalyst 208. Base or salts may also be added in the extractor 288, to the water supply 272, or to the catalyst 208 after it is separated from water in the separator 276.

EXAMPLE

Example Details

Materials:
Different titanium dioxide products (anatase and rutile) were used without modification other than exhaustive rinsing with deionized water:anatase, 99.9% (metals basis), −325 Mesh powder, density 3.9 (Alfa Aesar); rutile, 99.5% (metals basis), 1-2 μm average particle size, density 4.23 (Alfa Aesar); $TiO_2$, 99.9+% (metals basis), powder, density 3.9 (Aldrich); and $TiO_2$, 99.8% (metals basis), powder, density 3.9 (Aldrich).

Chemicals were used as received: NaOH 97+%, pellets (Acros Organics); CaO 96+% powder (Fisher Scientific); KOH 85+%, pellets (Sigma-Aldrich); Helium gas, ultra high purity (Airgas Inc); and nitrogen gas (Airgas Inc).

All solutions were prepared with nanopure water (18.3 MΩ·cm).

Equipment:
The instrument used to determine nitrate and nitrite was a Dionex ICS-1000 Ion Chromatograph System with conductivity detection. A Dionex AS18 4×250 mm column and a Dionex ASRS Ultra II 4 mm suppressor were used with 23 mM NaOH eluant (prepared from 50% w/w NaOH). The flow rate was 1.0 mL/min and the sample loop volume was 25 μL. The concentration of nitrate and nitrite were calculated using 6-point external standard calibration curves. Thermal treatments were carried out in standard laboratory ovens using either 15 mm diameter Petri dishes with borosilicate covers, or 100-500 ml volumetric flasks (5-10 mm diameter) with glass stoppers.

Methods:
Aqueous suspensions of $TiO_2$, containing 0.1-10 g of either anatase or rutile titanium dioxide, were prepared in 10-30 ml of nanopure water (18.3 MΩ) and added to the Petri dishes or flasks and evaporated under vacuum or ambient temperature to form thin films. $TiO_2$ films were exposed to heat treatment (from 50° C.-400° C.) in He, $N_2$ or ambient atmospheres in a conventional laboratory oven for varying times (2-24 hours). Following thermal treatment, $TiO_2$ samples were extracted with 15-35 mL of deionized water, sonicated for 5 minutes, shaken for 2-3 hours, and centrifuged. The supernatant was filtered through a 0.45 μm filter and analyzed by ion chromatography.

For isotopic labeling studies, anatase powder was repeatedly washed to remove background nitrate and slurries were prepared in deionized water and placed in 100 mL flasks. Aqueous suspensions of anatase were vacuum-dried and tightly sealed with rubber septa. 5 mL of air were replaced by 5 mL of labeled nitrogen at atmospheric pressure and flasks were placed in a laboratory oven and heated at 200° C. for 2.5 hours. An equal number of samples were also thermally treated in the normal atmosphere at 200° C. for 2.5 hours. Nonlabeled $^{15}N$ samples were heated under ambient conditions at the temperature and time mentioned above.

In other studies, anatase was initially heated in 5 mL of $^{15}N$ gas at 200° C. for 50 hours in the presence of NaOH, then repeatedly washed. Pretreated anatase materials were used to prepare suspensions in deionized water, poured into 100 mL containers or petri dishes and NaOH (6.45 mg) was added to some samples. 100 mL containers were dried in a vacuum, sealed with rubber septa and exposed to thermal treatment in 5 mL of $^{15}N$ tracer at 200° C. for 50 hours. Petri dishes (177 $cm^2$) containing anatase were heated under ambient conditions. The isotopic signature of nitrates was analyzed by USGS laboratory in Reston, Va. The process involved a bacterial denitrification of the nitrate to nitrous oxide, $N_2O$. The mass spectrometric method assigns a mass of 44 as $^{14}N$ on both nitrogens and $^{16}O$ on the oxygen. Mass 45 indicates one $^{15}N$ present, and mass 46 is assigned as one $^{18}O$ present. However, as discussed later in this Example, this may also be the result of two $^{15}N$ atoms in the $N_2O$, which could have arisen by oxidation of an $^{15}N_2$ to an intermediate product with both heavy atoms present, followed by a denitrification that produced $^{15}N_2O$, also with a mass of 46.

Sand samples, collected from Pyramid Lake, Nev., were used in the native state without grinding or other treatment affecting the surface of the minerals present. Natural soils/sands were further characterized for grain size distribution, organic content, extractable metals (particularly titanium, iron, and other major metals). After prewashing, 15 g of sand/soil of different grain sizes were placed in the Petri dishes or volumetric flasks and thermally treated as described above.

Results and Discussion

Synthesis of Nitrate Via Thermal Fixation of $N_2$ on $TiO_2$:
The thermal conversion of nitrogen to nitrate in the presence of $TiO_2$ and air or pure nitrogen gas and in the absence of light was investigated by analyses of more than 500 samples under varying conditions. As summarized in Table 1, thermally treated $TiO_2$ films (both anatase and rutile) were significantly higher in nitrate than those of the unheated or air-dried samples. Elevated concentrations of nitrate were observed when the $TiO_2$ films were heated at 50° C.-400° C.

TABLE 1

The effect of heat treatment of rutile and anatase $TiO_2$ films on the atmospheric fixation of $N_2$ to nitrate, (5 g of $TiO_2$, plate area = 177 $cm^2$)

| Sample name | $NO_3^-$ mg/kg | t(*) hour | T() ° C. | n(*) |
|---|---|---|---|---|
| R, air-dried, not pre-washed | 1.06 ± 0.10 | 0 | RT | 4 |
| R, unheated, not pre-washed | 1.04 ± 0.09 | 0 | 0 | 4 |
| R, unheated, pre-washed | 0.80 ± 0.11 | 0 | 0 | 4 |
| R, pre-washed | 1.69 ± 0.04 | 5 | 50 | 4 |
| R, pre-washed | 1.89 ± 0.05 | 3 | 70 | 4 |
| R, pre-washed | 4.18 ± 0.10 | 2 | 200 | 4 |
| R, pre-washed | 4.00 ± 0.16 | 2 | 400 | 6 |
| A, unheated, not pre-washed | 1.51 ± 0.12 | 0 | 0 | 6 |
| A, not pre-washed | 2.04 ± 0.14 | 5 | 50 | 6 |

R: Rutile, A: Anatase. (*) (): Length and temperature of heat treatment. (*): Number of samples. RT: Room Temperature.

Figure 3:
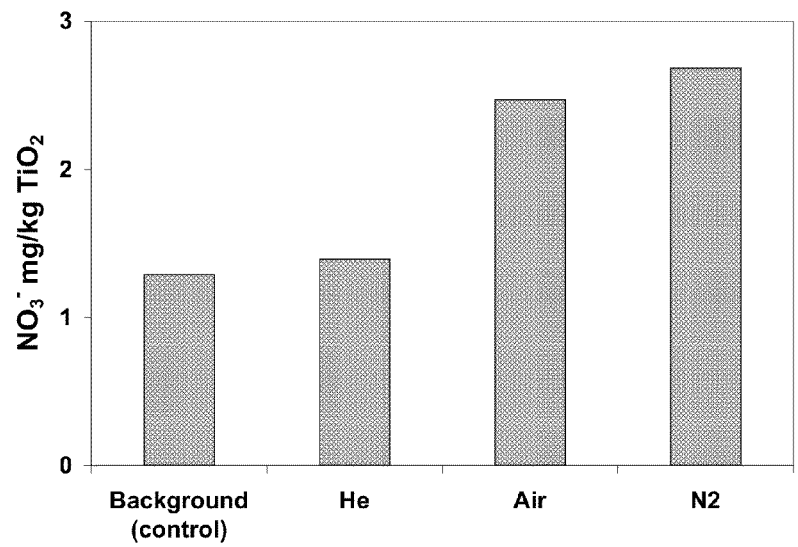
FIG. 3 is a graph of nitrate production (mg/kg) for rutile $TiO_2$ catalyst heated at 200° C. for 2 hours in air, helium, and nitrogen atmospheres.

TiO$_2$ Heated in N$_2$, Air, and He Atmospheres:

Aqueous suspensions of rutile TiO$_2$ (6 TiO$_2$, plate area 19.5 cm$^2$, volume 500 mL, n=4 for each column) heated at 200° C. for 2 hours in an atmosphere of pure nitrogen exhibited an 18% increase in nitrate concentration compared with samples heated in the normal atmosphere. However, when rutile TiO$_2$ was heated in He gas under identical experimental conditions, little or no nitrate was observed (FIG. 3). Furthermore, nitrate production in unheated TiO$_2$ samples purged with nitrogen gas did not exceed background levels. These results demonstrate that nitrate observed on heated TiO$_2$ surfaces was formed by thermal fixation of atmospheric nitrogen. Under the conditions used in this Example, both nitrogen and oxygen are used in the fixation process. Nitrogen gas is supplied from air and oxygen comes either from air, dissociation of water (ambient water vapor or pre-adsorbed water on TiO$_2$), or hydroxyl groups from the TiO$_2$.

To remove background nitrate, the materials were either calcined at 1000° C. for 16 hours or vigorously washed with deionized water prior to heat treatment. However, variations in background nitrate levels were still observed and may have resulted from a TiO$_2$ pre-washing process which was inconsistently implemented. The materials were repeatedly pre-washed from 3 to 15 times for 90-120 minutes for each washing step.

The process of annealing at 1000° C. was expected to remove any nitrate originally contained in the TiO$_2$ material, however, traces of nitrate ranging from 0.8-1.0 mg/kg were consistently detected in rutile samples calcined at 1000° C. for 16 hours. This residual nitrate may result from the gradual cooling of rutile TiO$_2$ and, once at a temperature range of 50° C.-400° C. (the region of elevated nitrate production) and in the presence of ambient water vapor, the catalytic activity of the surface layer of the material was restored and fixed nitrogen.

Figure 4:
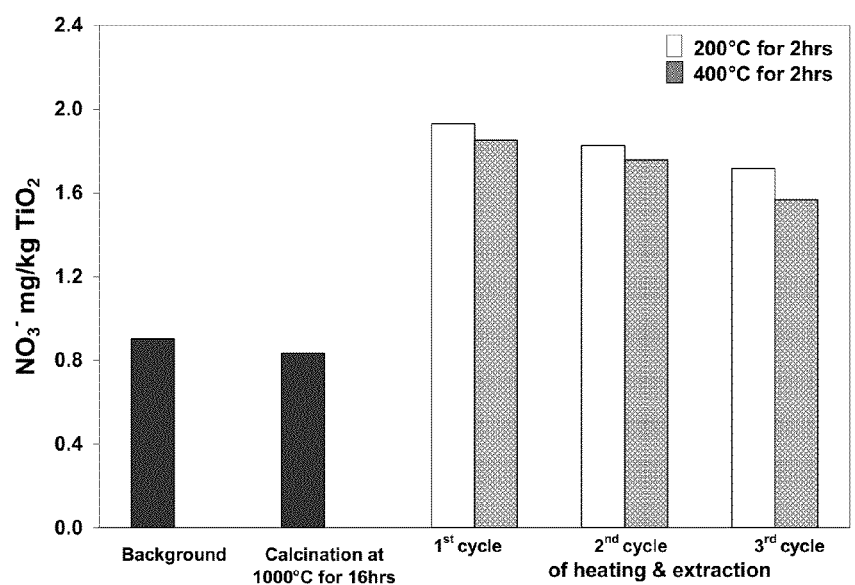
FIG. 4 is a graph of nitrate production (mg/kg) for rutile $TiO_2$ catalyst calcined at 1000° C. for 16 hours and then heated at 200° C. or 400° C. for two hours for three successive cycles.

This assumption is consistent with data obtained when rutile TiO$_2$ samples (9 g, plate area 177 cm$^2$, n=3 for each column) were pre-calcined at 1000° C. for 16 hours, washed, and subsequently heated at 400° C. and 200° C. for 3 consecutive heating cycles. In every heat treatment cycle, the rutile samples were exposed to heat for 2 hours and then washed. As shown in FIG. 4, rutile materials pre-calcined at 1000° C. had restored surface activity and continued to fix nitrogen to nitrate at both temperatures tested with slightly higher production observed at 200° C.

Differences in thickness and mass of various TiO$_2$ thin films may affect the TiO$_2$-atmosphere interaction, resulting in varying levels of nitrate production under similar experimental conditions. The films also occasionally crack and peel while heated, changing the plate area of the film.

Figure 5:
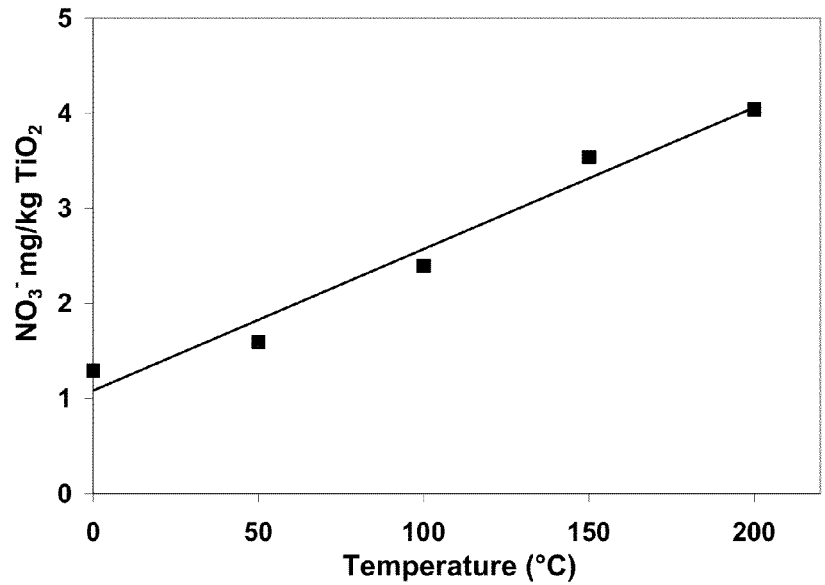
FIG. 5 is a graph of nitrate production (mg/kg) versus temperature (° C.) for rutile $TiO_2$ catalyst heated in air for 2 hours.

Effect of Temperature and Time Variables:

The effects of varying the temperature at which the TiO$_2$ materials (4 g TiO$_2$, plate area 177 cm$^2$, n=4 for each time point) were heated are illustrated in FIG. 5. As the temperature of heat treatment on rutile TiO$_2$ samples was increased from 50° C.-200° C. in ambient atmosphere, the nitrate concentrations increased, with all samples treated for 2 hours. This observation supports that the rate of nitrate fixation is related to temperature at least in the temperature range of 50° C.-200° C.

Figure 6:
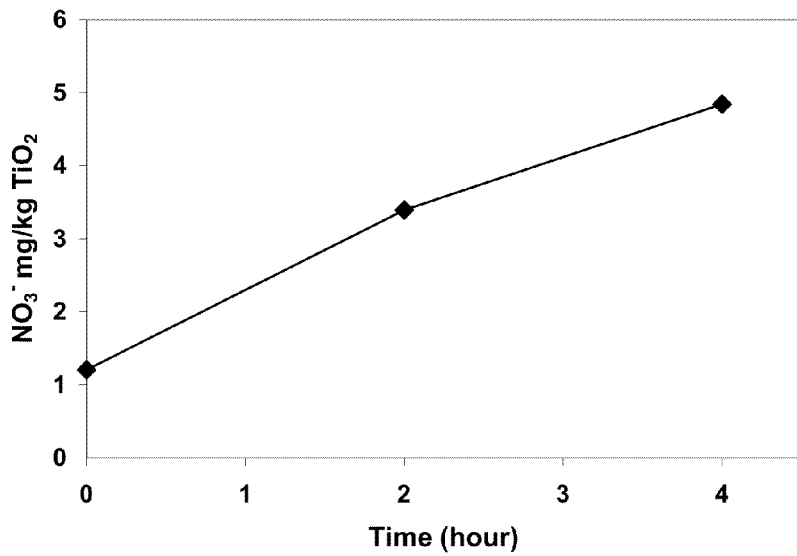
FIG. 6 is a graph of nitrate production (mg/kg) versus time (hours) for rutile $TiO_2$ catalyst heated in air at 200° C.
Figure 7:
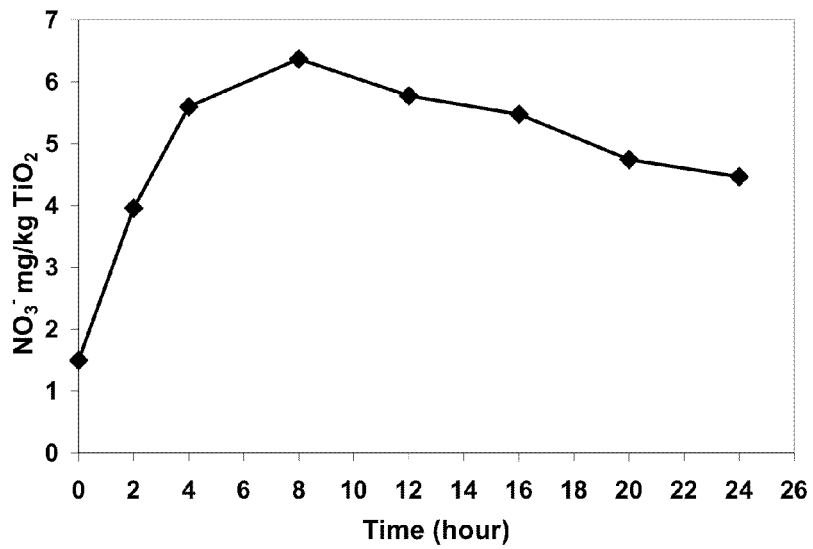
FIG. 7 is a graph of nitrate production (mg/kg) versus time (hours) for anatase $TiO_2$ catalyst in air heated at 200° C. for 24 hours.

FIG. 6 shows the concentration of nitrate versus the duration of heat exposure for various TiO$_2$ materials (4 g TiO$_2$, plate area 177 cm$^2$, n=3 for each time point). With heat maintained at about 200° C. over a period of about 4 hours, nitrate production on rutile TiO$_2$ surfaces increased with time. Prolonged thermal exposure of anatase (5 g TiO$_2$, plate area 177 cm$^2$, n=4 for each time point) in air at 200° C. for 24 hours demonstrated that nitrate yields were maximized at 4 hours, as shown in FIG. 7. On further thermal treatment, nitrate yields decreased, either due to a reduction in the ability of the anatase to produce nitrate, or the rate of nitrate production approximated the rate of nitrate loss.

Figure 8:
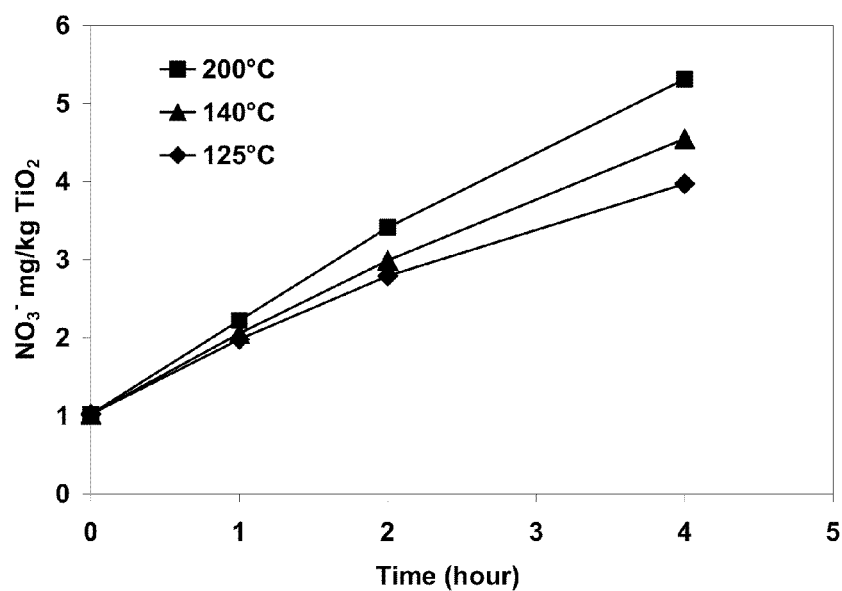
FIG. 8 is a graph of nitrate production (mg/kg) versus time (hours) for anatase $TiO_2$ catalyst heated at 125° C., 140° C., and 200° C.

To examine the simultaneous effects of time and heat, aqueous suspensions of anatase TiO$_2$ (5 g TiO$_2$, plate area 177 cm$^2$, n=3 for each time point) were heated at 125° C., 140° C., and 200° C. over a period of 4 hours. The results of these tests are shown in FIG. 8. Nitrate formation reactions initially proceeded at similar rates at all temperatures tested, but as heat treatment continued, the rates varied with temperature. Nitrate yields were higher at 200° C. than at 140° C. or 125° C. Thus, this Example demonstrates that nitrate formation, at least when atmospheric nitrogen is used as the substrate, is affected by both the temperature of the material and the duration of reaction.

As can be seen from Table 1 and FIG. 4, TiO$_2$ heated for 2 hours at 200° C. in air and in the absence of light yielded relatively higher nitrate than TiO$_2$ heated at 400° C. Thus, it appears that, between 200° C. and 400° C., the nitrate production rate declines slightly. Above 400° C. the nitrate production rate is presumed to decrease fairly quickly. Temperatures above 400° C. show lower yields of nitrate, presumably due to either slower nitrate formation or degradation of nitrate. Therefore, it appears that 200° C. provides better results with these samples than 400° C.

Effect of Base and Acid:

As the temperature of thermal treatment was raised, nitrate yields increased and the surface acidity gradually increased. The gradual accumulation of acid on the surface layer in the course of thermal treatment of TiO$_2$ and subsequent nitrate formation decreased the rate of nitrogen fixation and resulted in lower yields.

Figure 9:
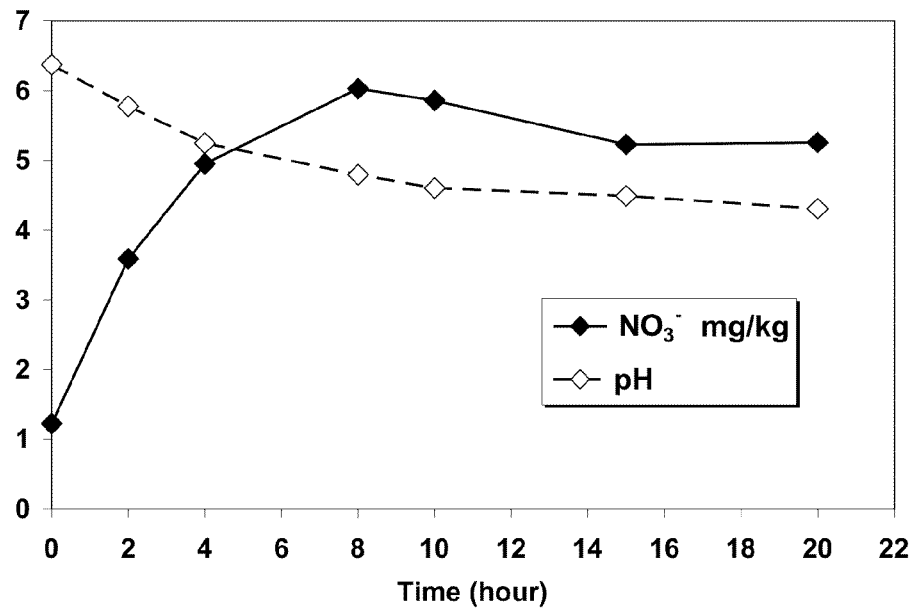
FIG. 9 is a graph of nitrate production (mg/kg) and pH versus time (hours) for rutile $TiO_2$ catalyst heated at 200° C.

As observed in FIG. 9, both nitrate levels and acidity initially increased when a rutile TiO$_2$ sample (5 g TiO$_2$, plate area 177 cm$^2$, n=6 for each nitrate point and 3 for each pH point) was heated at 200° C. for 20 hours. Up to 8 hours, catalytic activity remained unaffected. As heating continued, surface layers became more acidic and nitrate levels declined. These results evidence that high surface acidity, such as a pH lower than about 5.5, can be detrimental to nitrate formation. Above a certain level of acidity, overall, surface reactions are dominated by degradation reactions.

Figure 10:
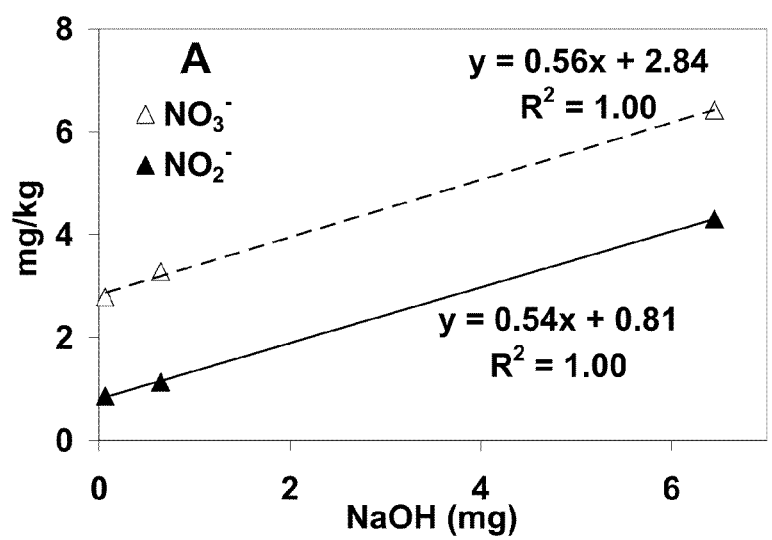
FIG. 10 is a graph of nitrate and nitrite formation (mg/kg) versus the weight of sodium hydroxide (mg) added to a rutile $TiO_2$ catalyst heated at 200° C. for 2 hours.
Figure 11:
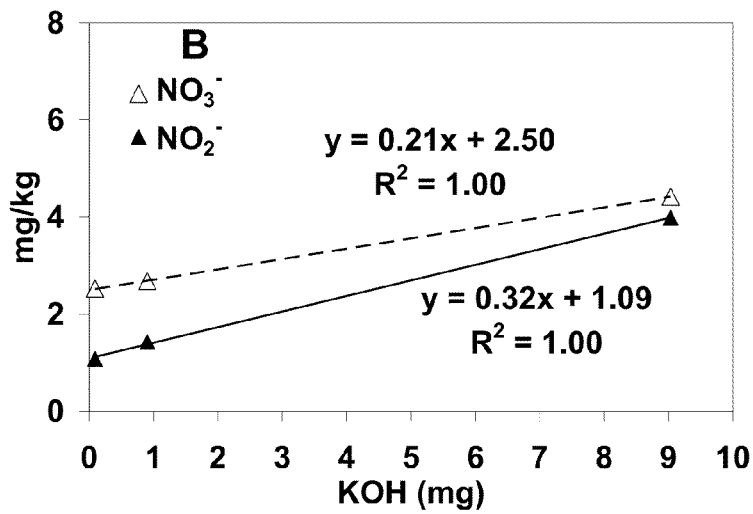
FIG. 11 is a graph of nitrate and nitrite formation (mg/kg) versus the weight of potassium hydroxide (mg) added to a rutile $TiO_2$ catalyst heated at 200° C. for 2 hours.

TiO$_2$ materials exhibited an enhanced reactivity when treated with alkaline hydroxides (KOH and NaOH). As illustrated in FIGS. 10 and 11, for TiO$_2$ surfaces (5 g TiO$_2$, plate area 177 cm$^2$, n=3 for each point) heated at 200° C. for 2 hours, an increase in hydroxide concentration gave a proportional increase in nitrate production. The nitrite formation rate was directly proportional to increasing amounts of hydroxide. It was also found that nitrite gradually disappeared upon successive heat treatment of the TiO$_2$-hydroxide mixture. The TiO$_2$ materials may become slightly acidic with extended exposure to heat and the acid-neutralizing effect of hydroxide gradually become less effective. The tendency of TiO$_2$-hydroxide to form nitrite along with nitrate can be understood in terms of the formation of two pH regions on same surface film; slightly acidic sites catalyze nitrate production whereas basic sites promote the formation of nitrite.

Figure 12:
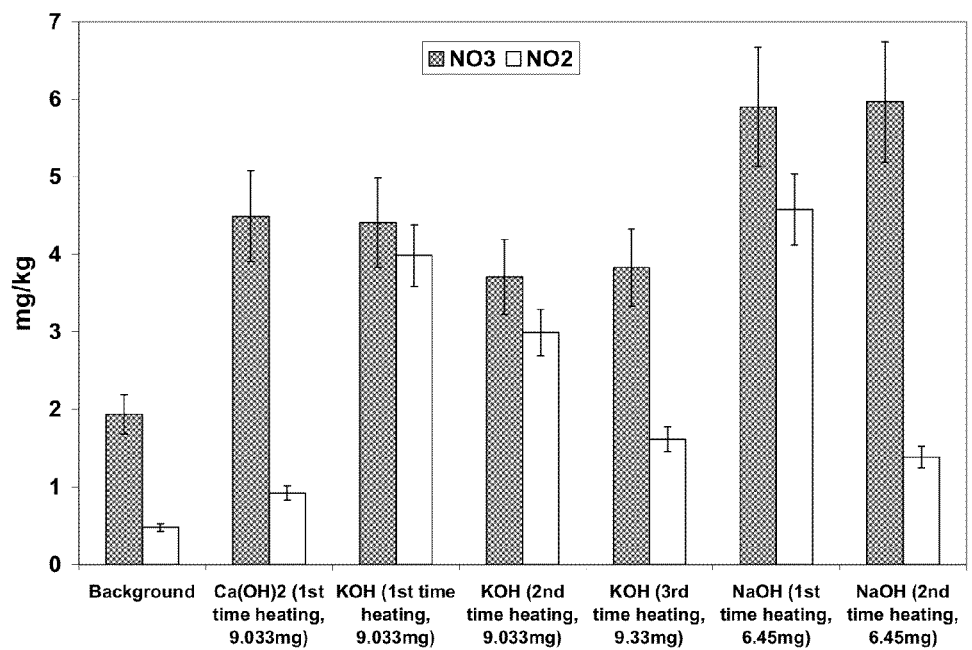
FIG. 12 is a graph of nitrate and nitrite production (mg/kg) for rutile $TiO_2$ samples heated at 200° C. for 2 hours in the presence of calcium hydroxide, potassium hydroxide, or sodium hydroxide and the gradual disappearance of nitrite upon successive heating.

The reactivity of the mixture of hydroxide-TiO$_2$ depends on the type of hydroxide added, as shown in FIG. 12. When equivalent molar weights of NaOH, Ca(OH)$_2$, or KOH were added to TiO$_2$ heated at 200° C. for 2 hours (5 g TiO$_2$, plate area 177 cm$^2$, n=2 for each column), nitrate generation increased, particularly with the addition of NaOH.

Figure 13:
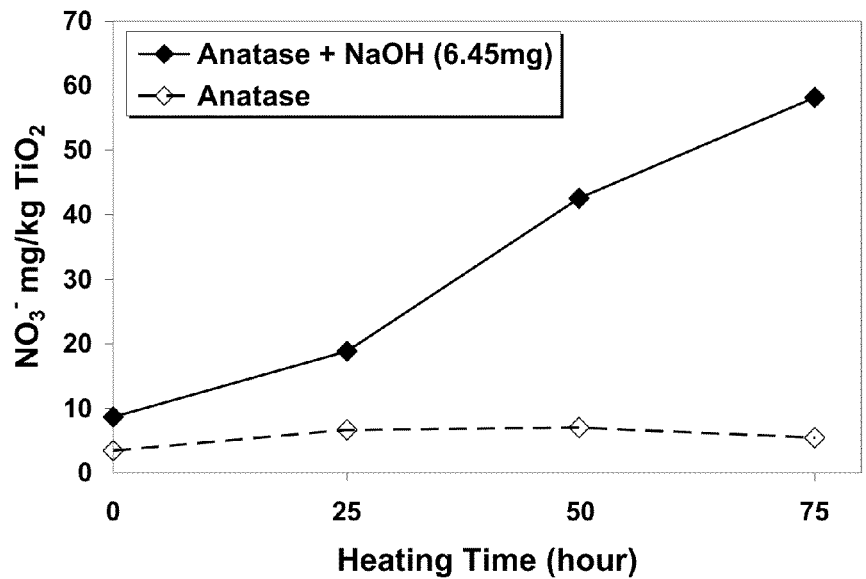
FIG. 13 is a graph of nitrate production (mg/kg) versus time (hours) when anatase $TiO_2$ catalyst-NaOH mixtures and anatase $TiO_2$ catalyst alone were heated at 200° C. under ambient conditions for 75 hours.
Figure 14:
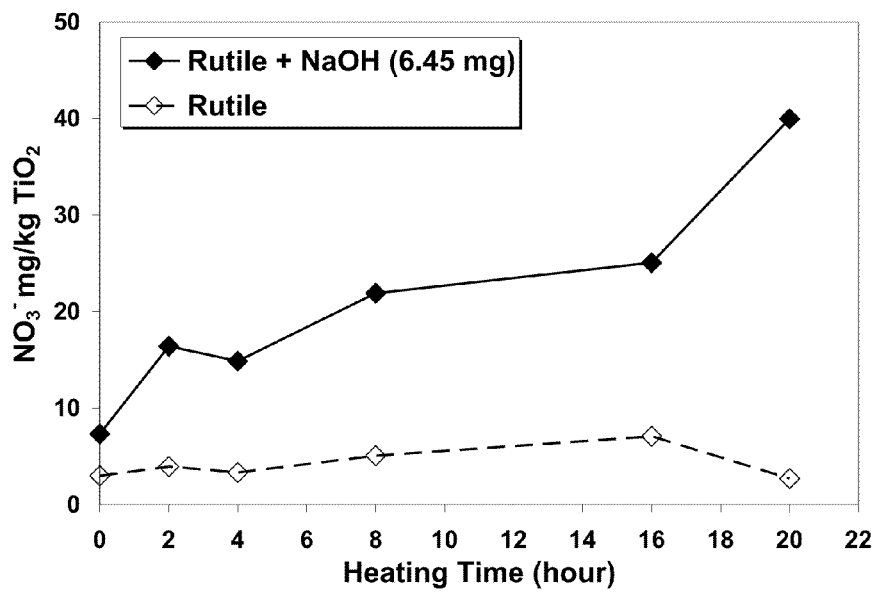
FIG. 14 is a graph of nitrate production (mg/kg) versus time (hours) when rutile $TiO_2$ catalyst-NaOH mixtures and rutile $TiO_2$ catalyst alone were heated at 200° C. under ambient conditions for 20 hours.

The improvement in production when base is added may be due to the acid-neutralizing effect of base on the TiO$_2$ surface. Accordingly, when TiO$_2$ suspensions used to create surface films were made basic and underwent prolonged heating at 200° C. in the normal atmosphere, nitrate yields substantially increased. As can be seen in FIG. 13, thermal treatment of anatase-NaOH (6.45 mg NaOH, 0.2-0.4 g TiO$_2$, plate area 23 cm$^2$, n=5 for each time point) mixtures at 200° C. for 75 hours resulted in a continual production of nitrates whereas much lower nitrate yields were observed when only anatase was heated. Similar effects were also observed when rutile (0.3 g TiO$_2$, plate area 177 cm$^2$, n=3 for each time point) was heated at 200° C. for 20 hours in the presence of NaOH (FIG. 14).

Figure 15:
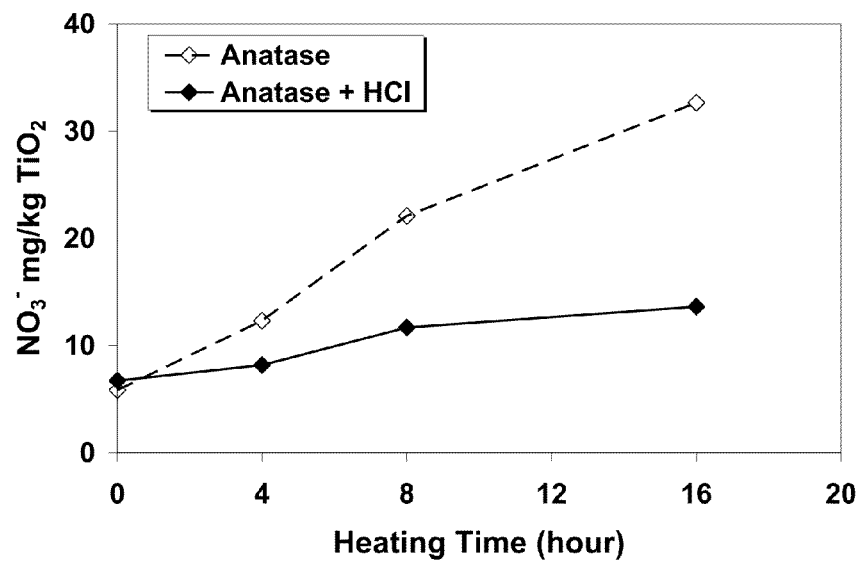
FIG. 15 is a graph of nitrate production (mg/kg) versus time (hours) for anatase $TiO_2$ catalyst slurries acidified to a pH of 2 with hydrochloric acid followed by a thermal treatment at 200° C. in air over a period of 16 hours.

As shown in FIG. 15, slurries of anatase (0.54 g TiO$_2$, plate area 177 cm$^2$, n=3 for each time point) acidified to pH 2 with hydrochloric acid followed by thermal treatment at 200° C. in air over a period of 16 hours exhibited a decrease in nitrate production. This decreased nitrate production supports that acidification of the surfaces inhibits nitrate generation. Nitrite was not formed when the TiO$_2$—HCl mixture was heated.

Figure 16:
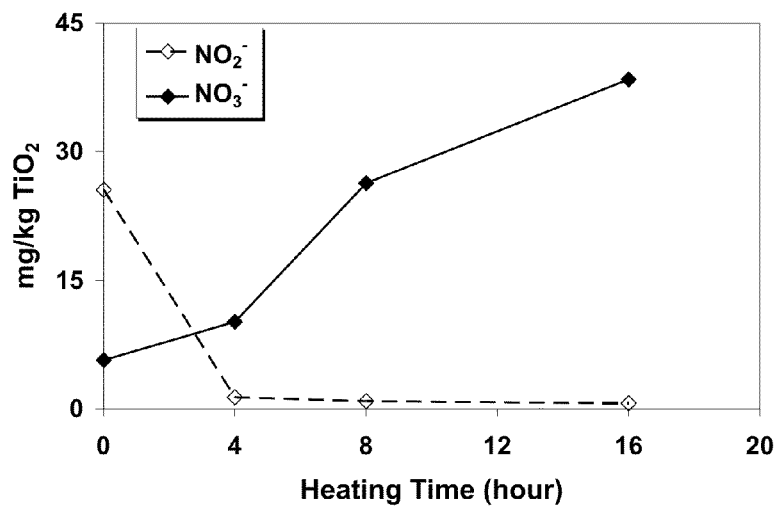
FIG. 16 is a graph of nitrate production (mg/kg) and nitrite decomposition (mg/kg) versus time (hours) for anatase $TiO_2$ catalyst films heated at a temperature of 200° C. in air for 16 hours.
Figure 17:
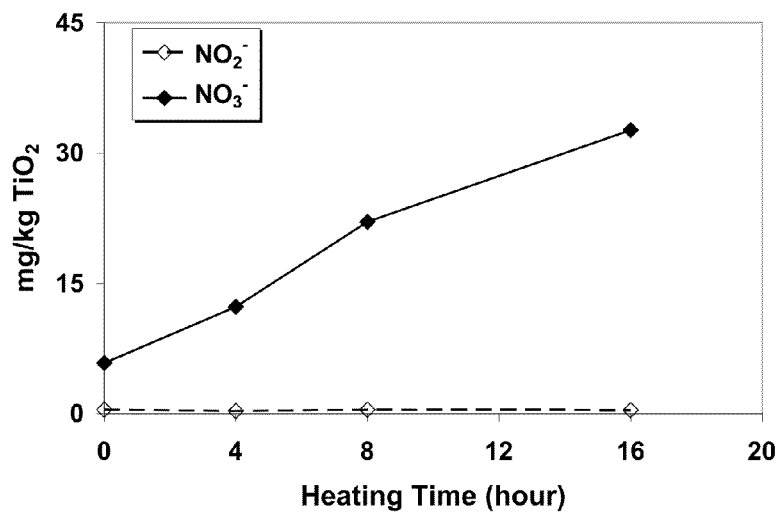
FIG. 17 is a graph of nitrate production (mg/kg) and nitrite production for anatase $TiO_2$ catalyst films heated at a temperature of 200° C. in air for 16 hours.

Except when base was present, little or no nitrite was consistently observed on heated TiO$_2$ surfaces, suggesting that if formation of nitrite occurs, it is rapidly oxidized to nitrate. To investigate whether the thermal production of nitrate occurs via a precursor mechanism involving the formation and subsequent oxidation of nitrite, nitrites (as NaNO$_2$) were added to TiO$_2$ films (0.54 g TiO$_2$, plate area 177 cm$^2$, n=3 for each time point) and thermally treated at 200° C. under ambient conditions. The results are presented in FIG. 16 and demonstrate that all quantities of nitrite added to anatase surfaces were rapidly decomposed during the initial stage of thermal treatment and that the loss of nitrite was not equal to the yields of nitrate. Following four hours of heating, nitrate concentrations continued to increase while no changes in nitrites were observed. FIG. 17 also shows that under the same condition employed, anatase (0.54 g TiO$_2$, plate area 177 cm$^2$, n=3 for each time point) generated similar yields of nitrates when no nitrite was added. The data suggest that decomposition of nitrite does not proceed to nitrate and that the reaction mechanism of nitrate on heated TiO$_2$ surfaces is independent of nitrite formation.

Plate Area and Mass of Catalyst:

The amount of nitrate thermally generated using various amounts of TiO$_2$ at the nitrogen/air-TiO$_2$ interface indicates that atmospheric nitrogen fixation is a surface phenomenon. It was determined that the thinner the TiO$_2$ film, the higher the nitrate production rate, on a per TiO$_2$ weight basis.

It was found that increasing the mass of catalyst does not have a measureable effect on the rate of nitrate formation, under the conditions used, and that the portion of TiO$_2$ involved in the thermal nitrogen fixation process is only the material at the TiO$_2$-atmosphere interface, not the entire mass of catalyst. The results presented in Table 2 demonstrate that when a TiO$_2$ mass, pre-heated at 200° C. for 2 hours, was split quantitatively into 3 portions per sample and then thermally treated at 200° C. for 2 hours, the sum of nitrate concentrations of all fractions was almost three times higher than was generated in the original unsplit sample. The results indicate that nitrogen fixation is more plate area dependent than mass of catalyst dependent.

TABLE 2

The effect of the amount of heated rutile TiO$_2$ on nitrate production (plate area = 177 cm$^2$, heated at 200° C. for 2 hours).

| Sample name | TiO$_2$ weight g | NO$_3^-$ generated mg/kg |
| --- | --- | --- |
| R | 6.00 | 1.67 |
| R$_{f1}$ | 2.00 | 1.73 |
| R$_{f2}$ | 2.15 | 1.55 |
| R$_{f3}$ | 1.85 | 1.84 |

R Unsplit Rutile Sample.
R$_{f1}$ Split Rutile, Fraction 1

Figure 18:
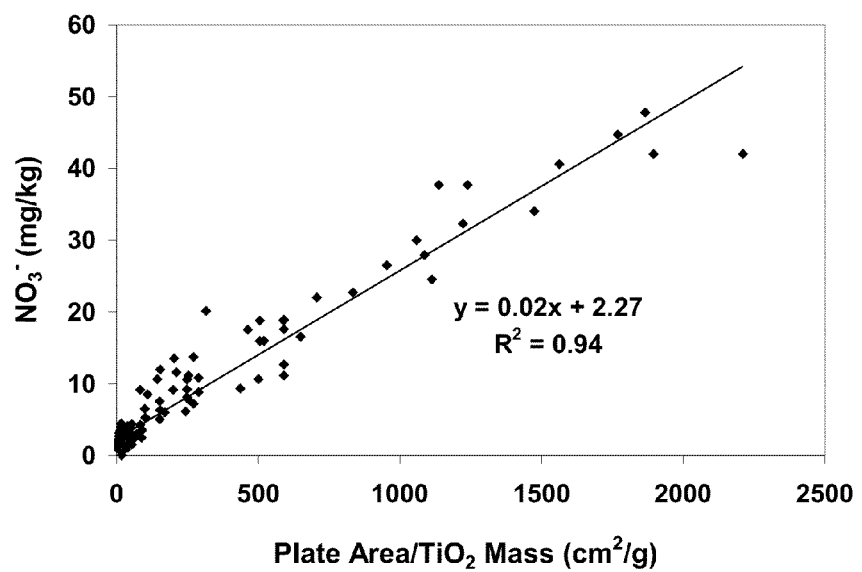
FIG. 18 is a graph of nitrate production (mg/kg) versus catalyst plate area ($cm^2/g$) for rutile and anatase $TiO_2$ catalysts illustrating increased mass production with increasing plate area.

Plotting the yields of nitrate production versus plate area of both heated rutile and anatase TiO$_2$ (n=147), shown in FIG. 18, indicated that the nitrate production rate is proportional to the ratio of the plate area to the weight of TiO$_2$. These ratios demonstrate that very thin films can be used for active nitrate production and that reactivity is increased by increasing the plate area of the catalyst.

Figure 19:
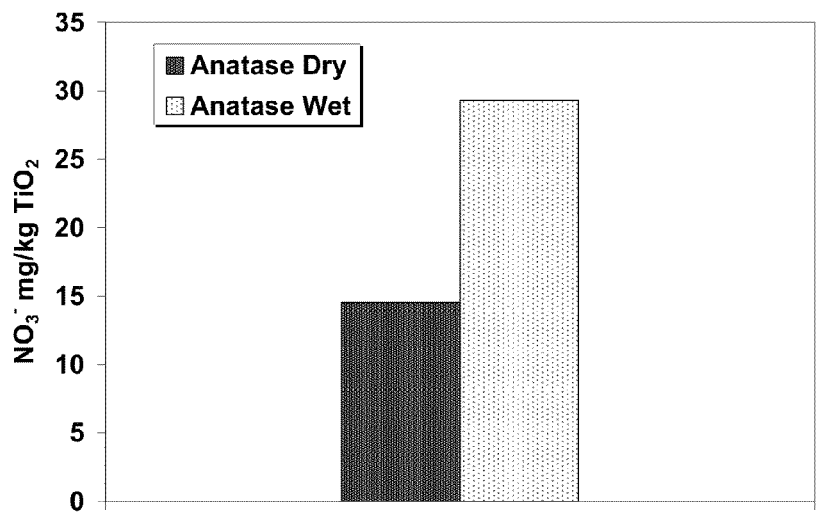
FIG. 19 is a graph of nitrate production (mg/kg) on loose powder and films of anatase $TiO_2$ catalyst heated at 200° C. for 2 hours under ambient conditions.

Nitrate production on fine loose powder of anatase was compared with thin films (after thermal evaporation of anatase slurries). FIG. 19 shows that the hard surface films of anatase (0.6-9 g TiO$_2$, plate area 177 cm$^2$, n=3 for each column) have produced larger yields of nitrate compared with powdered anatase, despite the larger plate area for the powdered anatase.

Effect of Prolonged Heating:

Prolonged heating of TiO$_2$ demonstrated that nitrate production tends to a limiting yield in some examples. In these and subsequent examples where samples were taken over time, the production of nitrate appeared to increase to a maximum followed by a slight reduction in yield and then additional production of nitrate was not observed. These data also suggest that thermal nitrogen fixation at the TiO$_2$-air interface may be governed by surface decay-formation reactions that are dependent on the surface film conditions, in particular, acidity and availability of active sites.

Upon heat treatment, the initial reactions on the TiO$_2$ surface film generally produce nitrate in a linear fashion. Without intending to be bound by theory, the system may reach a steady state, or slightly favor nitrate degradation, when: (1) surface active sites are effectively occupied (by achieving maximal surface coverage); or (2) acidity of the TiO$_2$ catalytic surface increases, as shown in FIG. 9. Both effects likely operate concurrently.

Figure 20:
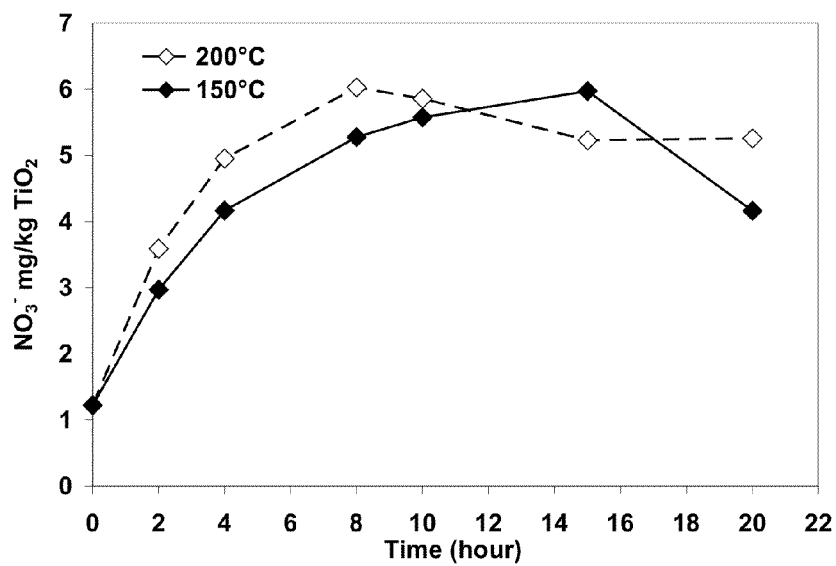
FIG. 20 is a graph of nitrate production (mg/kg) versus time (hours) for rutile $TiO_2$ catalysts heated at 150° C. or 200° C.

FIG. 20 illustrates the effect of prolonged heating on nitrate formation. When rutile TiO$_2$ (5 g TiO$_2$, plate area 177 cm$^2$, n=6 for each 200° C. point and 4 for each 150° C. point) is heated at 200° C. in a first stage (the time interval from 0-8 hours), the amount of nitrate formed gradually increases, with a maximum concentration achieved at about 8 hours. After that stage, there was slight decrease in yield. This decreased amount remained relatively constant with continued heating.

A similar pattern was observed when rutile TiO$_2$ was heated at 150° C. As can be observed from FIG. 20, an increase in nitrate was observed up to about 15 hours of heat treatment. When the highest production rate was reached, further heating resulted in decreased nitrate yields, indicating that the degradation reactions become more predominate.

While degradation reactions may take place even during periods of net nitrate production, it appears that the surface decay reactions of nitrate become more significant after nitrate production has reached its maximum level. At preceding times, the rate of nitrate formation exceeds the degradation rate, resulting in net overall nitrate production.

Figure 21:
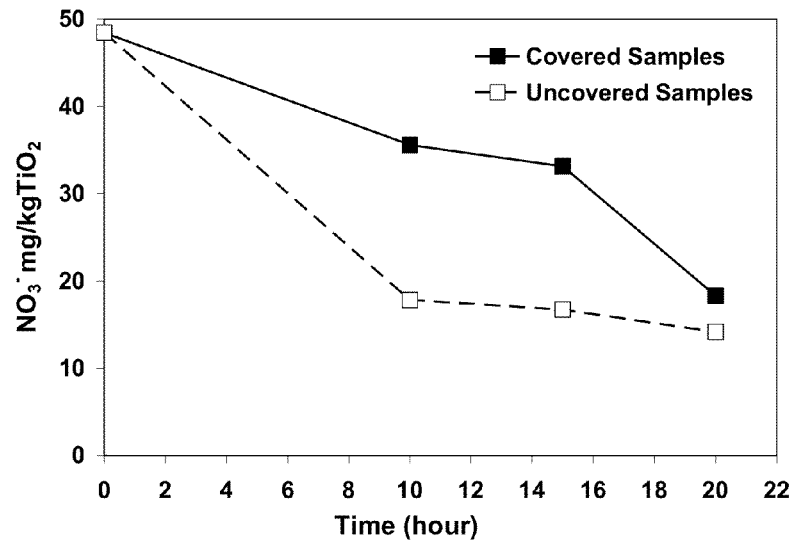
FIG. 21 is a graph of nitrate production (mg/kg) versus time (hours) for covered and uncovered rutile $TiO_2$ catalysts heated at 200° C. for 20 hours.

A nitrate stability study, the results of which are presented in FIG. 21, demonstrated the instability of nitrate on $TiO_2$ (5 g $TiO_2$, plate area 177 $cm^2$, n=3 for each time point) at elevated temperature. When nitrate was added as a salt ($NaNO_3$) to $TiO_2$, and the treated $TiO_2$ heated at 200° C. for 20 hours, only a decrease in nitrate was observed. Although additional nitrate may have formed, any amount formed was less than the amount degraded. Following 10 hours of heat exposure, about 70% of the nitrate added to the uncovered plates was lost. However, the degradation reactions slowed, resulting in a balanced nitrate concentration. This balance is likely achieved by degraded amounts being at least partially offset by newly formed nitrate.

Using covered samples with the same procedure, about 70% of the nitrate decayed after 20 hours of heat treatment. It is possible that the equilibrium reaction between nitrate and the gaseous products was maintained for a longer period of time as these gases have not immediately evacuated the containers. After 20 hours, it is presumed that nitrate decay will balance with nitrate formation in a similar manner as observed with the uncovered samples. Little to no nitrate formation was observed accompanying nitrate decomposition.

Figure 22:
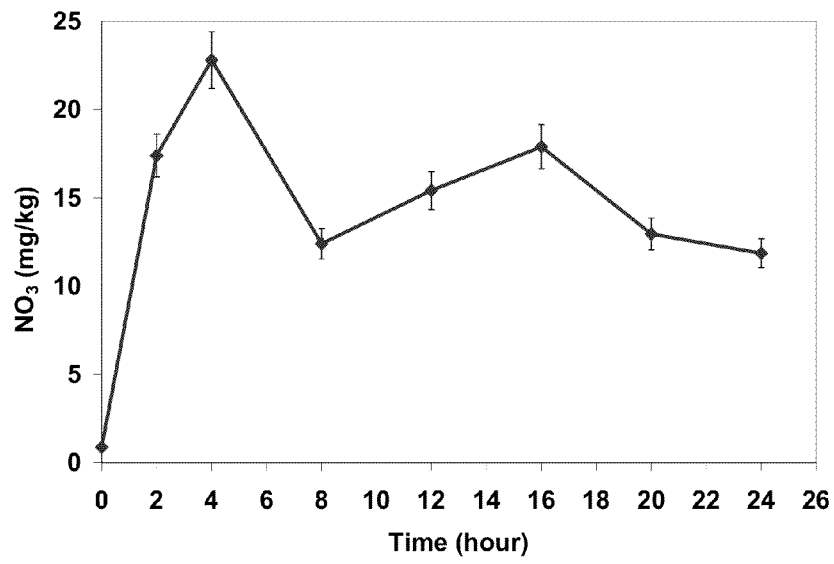
FIG. 22 is a graph of nitrate production (mg/kg) versus time (hours) for anatase $TiO_2$ catalyst heated at 200° C.

Prolonged thermal exposure of anatase $TiO_2$ in air at 200° C. for 24 hours demonstrated that nitrate yields were maximized at 4 hours, as shown in FIG. 22. On further thermal treatment, nitrate yields decreased, either due to a reduction in the ability of the anatase $TiO_2$ to produce nitrate, or the rate of nitrate production approximated the rate of nitrate loss.

Figure 23:
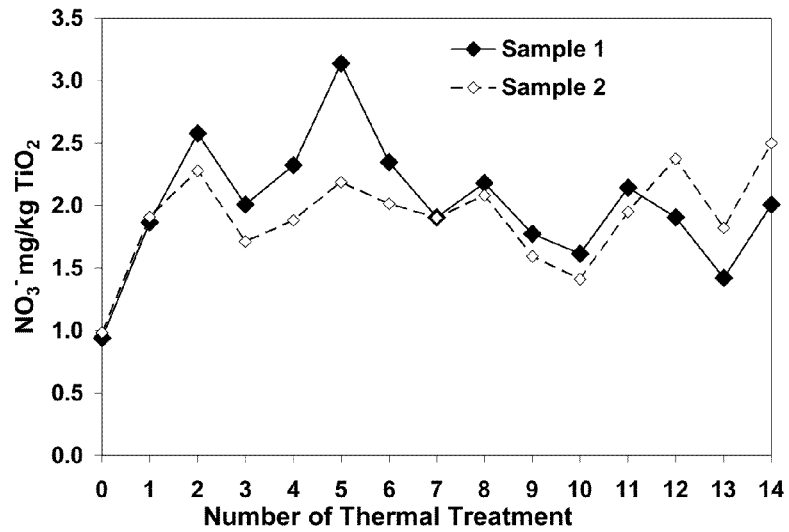
FIG. 23 is a graph of nitrate production (mg/kg) versus number of thermal treatment cycles of heating rutile $TiO_2$ catalyst for 2 hours at 200° C.
Figure 24:
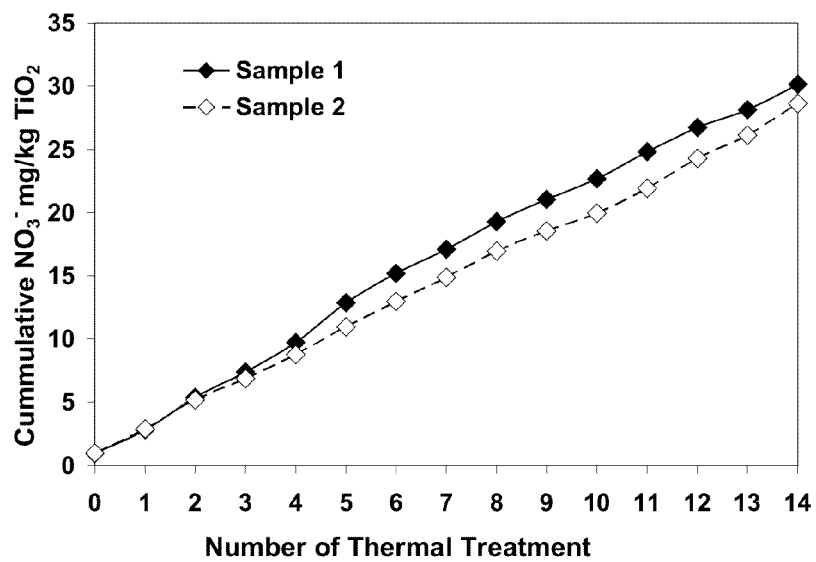
FIG. 24 is a graph of cumulative nitrate production (mg/kg) versus number of thermal treatment cycles of heating rutile $TiO_2$ catalyst for 2 hours at 200° C.

Successive Heat Treatment of Rutile $TiO_2$:

Successive cycles of heating and extraction of the same rutile $TiO_2$ fractions (10 g $TiO_2$, plate area 177 $cm^2$) at 200° C. for 2 hours, and up to 14 cycles of heat treatment, produced nearly constant yields for nitrate production in each cycle. Data for these studies is presented in FIGS. 23 and 24. The production of consistent yields suggests that nitrate formation is not a result of oxidation or release of nitrate that may have been contained in the $TiO_2$ prior to heating. These consistent, reproducible yields also highlight the industrial importance of this process, as a small mass of $TiO_2$ catalyst can be exploited to generate large quantities of nitrate through repeated production cycles with little change in surface reactivity. These results also suggest that aqueous removal of the nitrate and acidity restores the surface activity of $TiO_2$.

Figure 25:
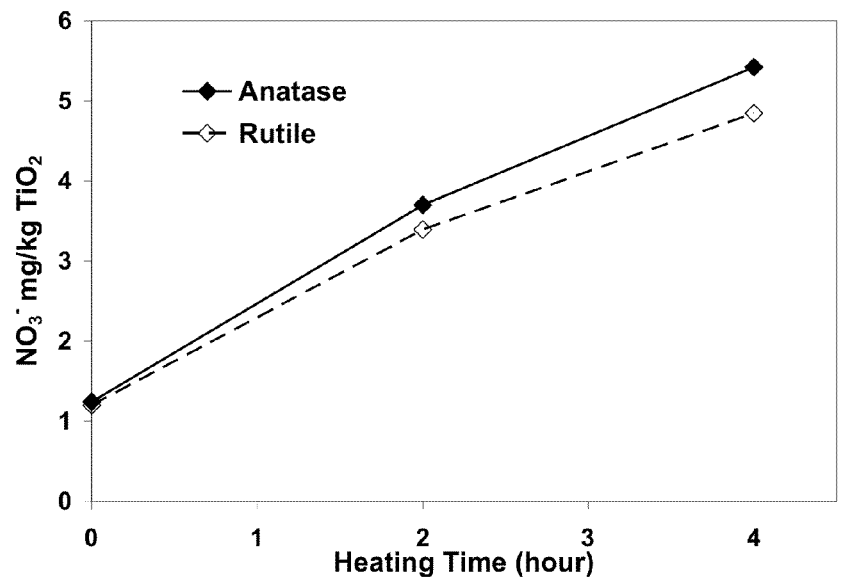
FIG. 25 is a graph of nitrate production (mg/kg) versus time (hours) for rutile and anatase $TiO_2$ catalysts heated at 200° C.
Figure 26:
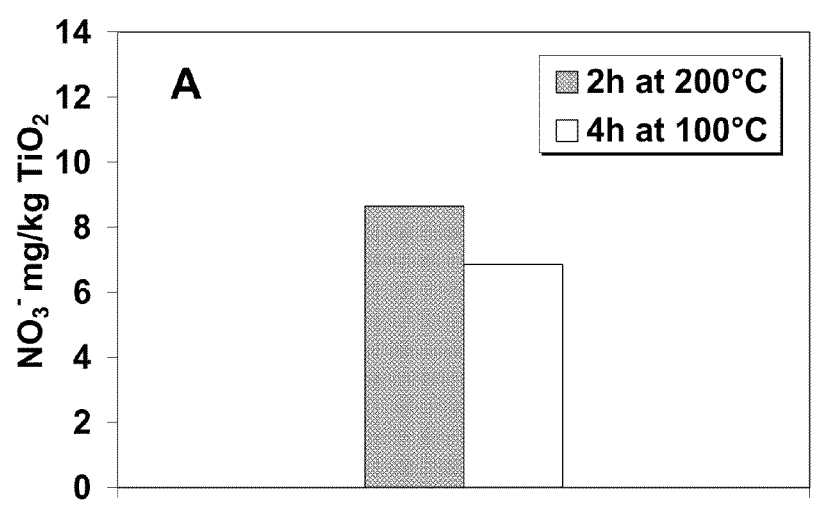
FIG. 26 is a graph of nitrate production (mg/kg) for rutile $TiO_2$ catalyst heated at 100° C. for 4 hours and 200° C. for 2 hours.
Figure 27:
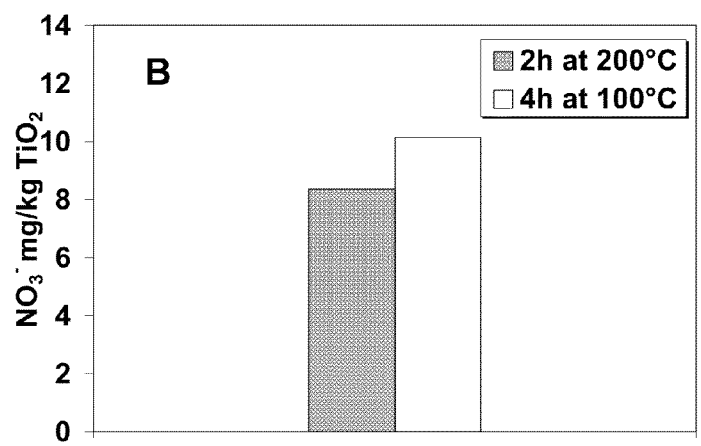
FIG. 27 is a graph of nitrate production (mg/kg) for anatase $TiO_2$ catalyst heated at 100° C. for 4 hours and 200° C. for 2 hours.

Comparison of Surface Reactivity of Anatase and Rutile $TiO_2$:

The rates of nitrogen fixation on aqueous suspensions of rutile and anatase $TiO_2$ surfaces were compared. The data presented in FIG. 25 indicates that the relative increase in nitrate production as a function of time for heated anatase $TiO_2$ (5 g $TiO_2$, plate area 177 $cm^2$, n=3 for each time point) was slightly higher than that of rutile $TiO_2$. FIGS. 26 and 27 demonstrate that anatase $TiO_2$ (FIG. 26: 0.61 g rutile $TiO_2$, plate area 177 $cm^2$; FIG. 27: 0.71 g anatase $TiO_2$, plate area 177 $cm^2$; both FIGS.: n=3 for each column) heated at 100° C. for 4 hours produced higher nitrate quantities than samples heated at 200° C. for 2 hours. However, under similar experimental conditions, rutile $TiO_2$ heated at 100° C. for 4 hours yielded lower amounts of nitrate compared to rutile $TiO_2$ samples heated at 200° C. for 2 hours. Accordingly, the selection of optimal catalytic conditions depends on the form of $TiO_2$ catalyst used.

$^{15}$N Isotopic Studies $^{15}$N labeling studies were performed to trace the source of nitrogen involved in nitrate production. In these studies, $TiO_2$ catalyst (anatase) was heated in $^{15}$N and in non-enriched atmospheric nitrogen either in the presence or absence of NaOH (NaOH was added to increase the yields of nitrate). The results of $^{15}$N isotope values of nitrate generated on anatase following thermal treatments at 200° C. for 2.5 hours and at 200° C. for 50 hours are shown in Tables 3 and 4. The $^{15}$N measurements of nitrate produced on anatase showed $d^{15}$N values that are larger than that of the background nitrate isotopic values, indicating that the $^{15}$N tracer was incorporated into nitrate. Except for unlabeled anatase heated at 200° C. at for 2.5 hours, all $d^{15}$N values of thermal nitrate are larger than that of atmospheric N. Anatase heated in labeled $^{15}$N gas showed high $^{15}$N signatures compared with unlabeled samples.

Also observed were what appeared to be highly elevated $^{18}$O isotopes in the $^{15}$N experiments, which is not possible, since the only isotope delivered was $^{15}$N. The methods used for determining both the $^{15}$N and $^{18}$O isotopes from nitrate may provide a rationale for why the elevated $^{18}$O isotopes were reported. When the nitrate isotopic signature is determined, the samples are treated microbially to produce $N_2O$ (mass 44) for mass spectrometric determination. For naturally occurring nitrate, denitrification was found to be convenient and unambiguous, since the probability of having two $^{15}$N atoms from the atmosphere is small and can be effectively ignored. One $^{15}$N atom in $N_2O$ gives a mass of 45 ($^{15}N^{14}N^{16}O$) A mass of 46 indicates the presence of $^{18}$O. Even if the sample has been isotopically enriched with 5% $N_2$, the chances of having two $^{15}$N derived from nitrate are effectively 5% of 5%, or an enhancement of a fraction of 0.0025. However, if $^{15}N_2$ is fixed in some oxidation state as $^{15}N_2O_x$ and is not further altered to separate the two nitrogen atoms, the molecule will contain both of the $^{15}$N atoms, and when converted to $N_2O$, will have a mass of 46, which is the same mass as $^{14}N_2^{18}O$. This isotopic enhancement will be reported as $^{18}$O.

It is reasonable to assume that the above explanation accounts for the observance of elevated $^{18}$O data. This may also suggest a mechanism for formation of nitrate in these surfaces. Because of the workup of the samples, the $^{18}$O values are probably variable, since the samples are exposed to the atmosphere prior to the denitrification, and the fixed nitrogen compounds would need to be fairly non-volatile to be retained in the aqueous fraction during workup. However, the samples are elevated in the $M^{+2}$ mass (assumed to be $^{18}$O, but almost certainly two $^{15}$N atoms) and the total fixation of nitrogen remains uncertain. However, the presence of the enhanced $^{15}$N indicates unambiguously that nitrogen is being fixed in these systems, and is probably also generated due to the m/e 46 observed, which was assigned as $^{18}$O.

TABLE 3

| Isotopic signatures of nitrate thermally generated on anatase heated at 200° C. for 2.5 hours in $^{15}$N labeled nitrogen and non-labeled gas (0.45 g of anatase). | | | | |
| --- | --- | --- | --- | --- |
| Sample name | $NO_3^-$ mg/kg | δ $^{15}$N permil | δ $^{18}$O** (‰) | $^{15}$N enrichment % |
| Labeled* | | | | |
| Anatase | 3.19 | +125.05 | +28.56 | 0.92 |
| Anatase | 2.58 | +1.46 | +62.96 | 0.02 |
| Anatase | 2.97 | +29.32 | +92.77 | 0.22 |
| Non-labeled* | | | | |
| Anatase | 2.35 | −1.33 | +35.10 | |
| Anatase | 3.10 | −2.40 | +36.42 | |

*These experiments were carried out in tubes with an area of 23 $cm^2$.
**See discussion. For the $^{15}$N enriched experiments, these values probably represent dually labeled $^{15}$N, rather than $^{18}$O.

While the apparent yields of nitrate were significantly increased in the presence of NaOH, addition of base showed variable effects on the isotopic composition depending on whether anatase was heated in labeled or unlabeled nitrogen. When anatase was heated in air at 200° C. for 50 hours, $^{15}$N values were slightly lowered and the $^{18}O$ signature of nitrate was affected by the addition of base and showed negative values.

TABLE 4

The $d^{15}N$ and $d^{18}O$ values and the yields of nitrate produced on anatase following thermal treatments at 200° C. for 50 hours in $^{15}N$ labeled nitrogen and non-labeled atmospheres (0.26-0.88 g of anatase).

| Sample name | $NO_3^-$ mg/kg | $\delta^{15}N$ permil | $\delta^{18}O$*** (‰) | $^{15}N$ enrichment % |
|---|---|---|---|---|
| Labeled* | | | | |
| Anatase | 10.85 | +33.79 | +43.62 | 0.25 |
| Anatase + NaOH | 5.47 | +75.99 | +43.40 | 0.56 |
| Anatase + NaOH | 7.45 | +56.68 | +22.99 | 0.42 |
| Anatase + NaOH | 57.80 | +147.94 | +130.61 | 1.09 |
| Non-labeled** | | | | |
| Anatase | 14.00 | +2.98 | +14.14 | |
| Anatase | 11.74 | +2.04 | +12.50 | |
| Anatase + NaOH | 66.10 | +0.33 | −11.40 | |
| Anatase + NaOH | 145.31 | +2.64 | −8.60 | |
| Anatase + NaOH | 62.00 | +1.00 | −9.19 | |
| Background (control) | | | | |
| Anatase | | −0.30 | +7.54 | |
| Anatase + NaOH | | −0.40 | +7.13 | |

*, **These studies were carried out in tubes with an area of 23 cm² and dishes with 177 cm² respectively.
***See discussion. For the $^{15}N$ enriched experiments, these values probably represent dually labeled $^{15}N$, rather than $^{18}O$.

Thermal treatment of anatase in either labeled $^{15}N$ or unlabeled gas at 200° C. for 50 hours showed larger yields of nitrate and were less enriched in $^{15}N$ compared with heating anatase at 200° C. for 2.5 hours. A similar effect was observed on heated Pyramid Lake soils. This may be due to $^{15}N$ fractionation as a result of prolonged heating.

An enriched $^{15}N$ value of 147.94% (the highest $^{15}N$ ratio of nitrate) means that about 1.1% of the 5 mL of $^{15}N$ was enriched into nitrate produced on anatase surface heated in unenriched atmosphere. The $^{15}N$ signature of nitrates is consistent with thermal fixation of atmospheric nitrogen to nitrate on $TiO_2$ surfaces.

Figure 28:
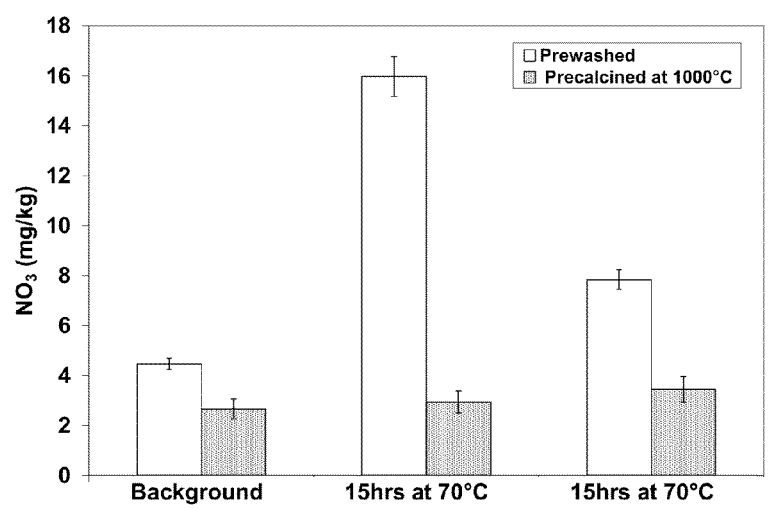
FIG. 28 is a graph of nitrate production (mg/kg) for prewashed or precalcined soil samples from Pyramid Lake, Nev., when unheated or heated at 70° C. for 15 hours.

Thermal $N_2$ Fixation on Soil Surfaces:

Thermal formation of nitrate was also observed on certain arid lands soils. FIG. 28 illustrates nitrate production from soil samples obtained from Pyramid Lake, Nev. Soil samples (sieved through 0.5 mm) were initially pre-calcined at 1000° C. for 24 hours or repeatedly washed to remove background nitrate. Following pre-treatment, the soils underwent thermal treatment at 70° C. for 15 hours. Nitrate production was observed for both the precalcined and washed samples, although the rate of production was generally lower in the case of soils pre-calcined at 1000° C. The lower rate of the pre-calcined samples may be due to alteration of the soil properties during exposure to high temperature.

Figure 29:
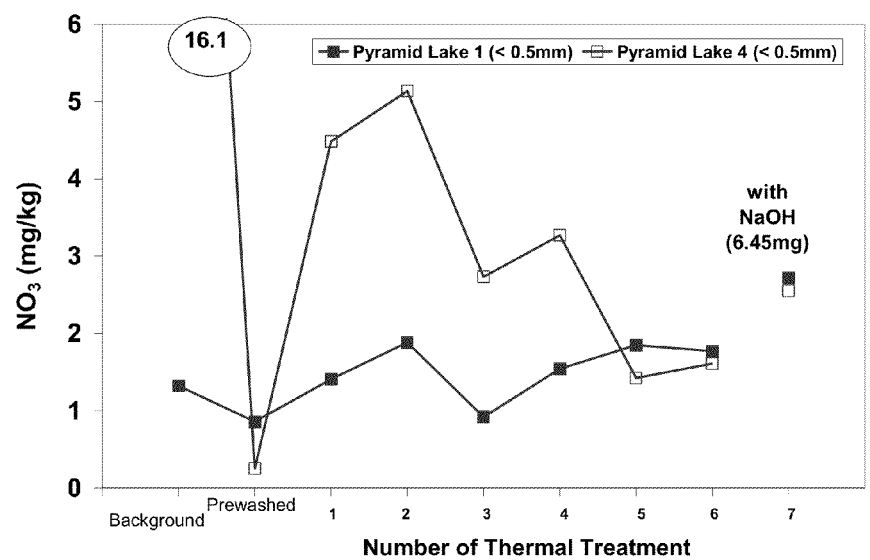
FIG. 29 is a graph of nitrate production (mg/kg) versus number of successive thermal treatments of soil samples from Pyramid Lake, Nev., heated at 200° C. for 2-4 hours.

Successive heat treatment and aqueous extraction of the same soil sample over 6 cycles resulted in continual nitrate yields in each cycle throughout the course of study. FIG. 29 illustrates that soil samples heated in normal atmosphere at 200° C. for 2-4 hours form nitrate during each cycle. The repeated formation of nitrate suggests that nitrate formation is not a result of oxidation or release of nitrate that may have been contained in the soils. Under the same experimental conditions, soils mixed with NaOH exhibited increased nitrate production.

SUMMARY AND CONCLUSION

A novel process for non-biological fixation of nitrogen to form nitrate has been identified, based on thermal treatment of titanium dioxide ($TiO_2$), both anatase and rutile forms, in the presence of air or pure nitrogen gas. $TiO_2$ heated in a He atmosphere showed little or no nitrate. As the studies in this example were carried out in the absence of light; photocatalytic reactions are not involved.

Nitrate was produced over the temperature range of 50° C.-200° C. following 2 hours of heating and gave yields that were linear with increasing temperature. Under the conditions employed, the yield of nitrate was a function of the plate area of the $TiO_2$. The thinnest films produced over 40 mg nitrate/kg $TiO_2$ following 2 hours of thermal treatment at 200° C. At temperatures greater than 400° C., nitrate formation was also observed, although thermal degradation of nitrate tended to reduce the observed yields. Formation of minor amounts of nitrite was also observed. Nitrate production was time dependent.

Successive heat treatment and aqueous extraction of the same $TiO_2$ sample over 14 cycles resulted in effectively identical yields for each cycle, suggesting that this process is not a result of oxidation or release of nitrate that may have been contained in the $TiO_2$. The pH of the final extracted $TiO_2$ suspensions was lowered to approximately 3-5, depending on the amount of nitrate produced, consistent with the formation of nitric acid. Addition of stoichiometric amounts of alkali or alkaline earth metal hydroxides, such as sodium, potassium, or calcium hydroxide, increased the amount of nitrate observed.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

What is claimed is:

1. A nitrogen fixation method, comprising:
   providing an amount of titania catalyst;
   contacting the titania catalyst with a feed stream comprising nitrogen;
   heating the titania catalyst at a temperature of between about 40° C. and about 600° C. to fix nitrogen from the feed stream to form oxidized nitrogen products; and
   removing the oxidized nitrogen products from the titania catalyst, comprising contacting the titania catalyst with water, the nitrogen products dissolving in the water;
   wherein heating the titania catalyst is carried out in the absence of light for photochemically activating the titania catalyst.

2. The nitrogen fixation method of claim 1, wherein heating the catalyst comprises heating the catalyst at a temperature of between about 150° C. and about 350° C.

3. The nitrogen fixation method of claim 1, wherein heating the catalyst comprises heating the catalyst at a temperature of between about 75° C. and about 600° C.

4. The nitrogen fixation method of claim 1, wherein heating the catalyst comprises heating the catalyst at a temperature of between about 175° C. and about 275° C.

5. The nitrogen fixation method of claim 1, wherein heating the titania catalyst is carried out in the presence of a base.

6. The nitrogen fixation method of claim 1, wherein heating the titania catalyst is carried out for an average time of at least about 2 hours.

7. The nitrogen fixation method of claim 1, wherein heating the titania catalyst is carried out for an average time of at least about 4 hours.

8. The nitrogen fixation method of claim 1, wherein heating the titania catalyst is carried out for an average time of at least about 6 hours.

9. The nitrogen fixation method of claim 1, further comprising converting solar radiation into heat to heat the titania catalyst.

10. The nitrogen fixation method of claim 1, further comprising enriching the feed stream in nitrogen.

11. The nitrogen fixation method of claim 1, further comprising separating the water from the titania catalyst.

12. The nitrogen fixation method of claim 11, further comprising removing the water to recover the nitrogen products.

13. The nitrogen fixation method of claim 11, further comprising regenerating the separated titania catalyst.

14. The nitrogen fixation method of claim 1, wherein the nitrogen products are formed in an amount proportional to the ratio of the surface area to the weight of the titania catalyst.

15. The nitrogen fixation method of claim 1, wherein the oxidized nitrogen products comprise nitrates or nitrites.

\* \* \* \* \*